(12) United States Patent
Nishi et al.

(10) Patent No.: US 7,722,704 B2
(45) Date of Patent: May 25, 2010

(54) EQUIPMENT AND METHOD FOR REMOVING NITROGEN OXIDE

(75) Inventors: Tamotsu Nishi, Tokyo (JP); Tadahiko Itoh, Tokyo (JP); Tsutomu Tanaka, Tokyo (JP)

(73) Assignee: Nishimatsu Construction Co., Ltd., Tokyo (JP)

( * ) Notice: Subject to any disclaimer, the term of this patent is extended or adjusted under 35 U.S.C. 154(b) by 256 days.

(21) Appl. No.: 10/598,763

(22) PCT Filed: Jan. 14, 2005

(86) PCT No.: PCT/JP2005/000396

§ 371 (c)(1),
(2), (4) Date: Nov. 9, 2009

(87) PCT Pub. No.: WO2005/084784

PCT Pub. Date: Sep. 15, 2005

(65) Prior Publication Data

US 2007/0186769 A1 Aug. 16, 2007

(30) Foreign Application Priority Data

Mar. 9, 2004 (JP) .............................. 2004-065839

(51) Int. Cl.
*B01D 53/02* (2006.01)
(52) U.S. Cl. .................. 95/129; 95/92; 95/148; 96/121; 96/144; 96/148; 96/143
(58) Field of Classification Search .............. 95/11, 95/92, 96, 129, 128, 148, 900, 902; 96/108, 96/109, 143, 144, 145, 121, 127, 130, 179, 96/148; 55/387, 389
See application file for complete search history.

(56) References Cited

U.S. PATENT DOCUMENTS

| 4,529,415 A | * | 7/1985 | Szirmay ..................... 95/144 |
| 6,719,828 B1 | * | 4/2004 | Lovell et al. ................. 95/134 |

(Continued)

FOREIGN PATENT DOCUMENTS

EP 0798143 10/1997

(Continued)

OTHER PUBLICATIONS

English Language Abstract of JP 2001-129345.

(Continued)

*Primary Examiner*—Michael A Marcheschi
*Assistant Examiner*—Karla Hawkins
(74) *Attorney, Agent, or Firm*—Greenblum & Bernstein, P.L.C.

(57) ABSTRACT

The present invention provides a nitrogen oxide removal equipment, a nitrogen oxide removal method, a container used for the removal of nitrogen oxide, and a method for filling the container. A nitrogen oxide removal equipment 94 according to the present invention supplies gas with the unevenness of flowing amounts eased to an absorption unit 94*a* via a gas rectification means 108 for supplying gas to a large-area side of solid absorbent layers, the absorption unit 94*a* being provided with solid absorbent layers including a plurality of low-profile solid absorbents 95 constituting the nitrogen oxide absorption means. Nitrogen oxide contained in gas effectively passes through the solid absorbent layers and removed.

30 Claims, 10 Drawing Sheets

U.S. PATENT DOCUMENTS

2002/0015669 A1 * 2/2002 Hashimoto .................. 422/171

FOREIGN PATENT DOCUMENTS

| JP | 51-148675 |   | 12/1976 |
|----|-----------|---|---------|
| JP | 53-077871 |   | 7/1978  |
| JP | 55-162331 |   | 12/1980 |
| JP | 1-296000  |   | 11/1989 |
| JP | 9-253452  |   | 9/1997  |
| JP | 10-211247 |   | 8/1998  |
| JP | 11-009957 |   | 1/1999  |
| JP | 11-262629 |   | 9/1999  |
| JP | 2000-015058 |   | 1/2000  |
| JP | 2001-129345 | * | 5/2001 |
| JP | 2001-259798 |   | 9/2001  |
| JP | 2002-153724 |   | 5/2002  |
| JP | 2002-253926 |   | 9/2002  |

OTHER PUBLICATIONS

English Language Abstract of JP 2002-153724.
English Language Abstract of JP 53-077871.
English Language Abstract of JP 55-162331.
English Language Abstract of JP 2002-253926.
English Language Abstract of JP 2000-015058.
English Language Abstract of JP 9-253452.
English Language Abstract of JP 1-296000.
English Language Abstract of JP 11-262629.
English Language Abstract of JP 51-148675.
English Language Abstract of JP 10-211247.
English Language Abstract of JP 11-009957.
English Language Abstract of JP 2001-259798.

* cited by examiner

EQUIPMENT AND METHOD FOR REMOVING NITROGEN OXIDE

FIELD OF THE INVENTION

The present invention relates to a method and an equipment for removing nitrogen oxide contained in gas, and particularly to a method capable of effectively removing nitrogen oxide contained in air, and a nitrogen oxide removal equipment capable of being used suitably in the execution of the above removal method.

BACKGROUND ART

There are conventional methods for removing nitrogen oxide contained in gas such as an ammonia denitration method and an urea denitration method for removing nitrogen oxide contained in a combustion gas for a boiler or a power generation facility such as a gas turbine or a gas engine etc. Further, there is a three-way catalyst method for removing nitrogen oxide contained in an exhaust gas of an automobile by using hydrocarbon contained in the exhaust gas as a reducer. In the removal of nitrogen oxide contained in the exhaust gas by the above method, the hydrogen oxide is reduced to nitrogen gas by using an energy of the exhaust gas at several hundred Celsius degrees. Further, the concentration of the nitrogen oxide in the combustion gas or the exhaust gas is generally several hundred ppms.

When the above nitrogen oxide removal method used for combustion gas or exhaust gas is applied as a method for removing nitrogen oxide contained in air, there is a problem of a low reaction rate due to a low concentration of nitrogen oxide contained in the air. In this case, there is another problem in that a large amount of energy is consumed to raise the temperature of the air, which is lower than the temperature of the combustion gas or the exhaust gas, to several hundred Celsius degrees.

Further methods for removing nitrogen oxide contained in air include an alkali absorption method using an alkali absorbing liquid (Patent Document 1), a reduction method using a reducer, and an absorption method using solid absorbents (Patent Document 2).

However, although the alkali absorption method is capable of absorbing nitrogen oxide of a low concentration, it also absorbs carbon dioxide contained together with the nitrogen oxide in air. Accordingly, there is a problem in that nitrogen oxide cannot be absorbed efficiently. As for the reduction method, since the reducer is oxidized by oxygen coexisting in the air, nitrogen oxide cannot be reduced efficiently. Further, as for the solid body absorption method, when nitrogen oxide is contained in air at a low concentration, the solid absorbents reach absorption breakthrough even though the solid absorbents have absorbed a few amount of nitrogen oxide. Accordingly, there is a problem in that the nitrogen oxide contained in the air cannot be absorbed sufficiently.

Furthermore, there is another method using a purification function of soil to remove nitrogen oxide contained in air at a low concentration. However, in case that the purification function of soil is used, there is a problem in that an extremely wide land is needed to secure a sufficient amount of soil to remove the nitrogen oxide.

A pressure required to pass gas through the above nitrogen oxide removal equipment is preferably low. Accordingly, the thickness of solid absorbents through which the gas passes is preferably as small as possible so far as the nitrogen oxide removal function thereof is not adversely affected.

However, to make the thickness of the solid absorbents through which gas passes small, the installation area for the solid absorbents needs to be increased along with increase in an amount of the gas to be treated in a unit time. Therefore, it is sometimes difficult to secure the installation space and this causes a problem. In particular, when the removal equipment needs to be constructed in a limited space although an amount of gas to be treated per unit time is large, there is a problem in that the removal equipment may not be installed because the installation space cannot be secured in the case where the removal equipment is installed specifically on a center divider, nearby a crossroads, under an elevated bridge, and in an air vent of a tunnel etc. in an urban area.

Furthermore, as the installation area for the solid absorbents increases, it is more difficult to pass gas through the solid absorbents at a constant flowing rate resulting in a problem of a phenomenon called "breakthrough" that the gas passes through the solid absorbents although the nitrogen oxide contained in the gas is not removed sufficiently by the solid absorbents, and this causes a problem of deterioration of the removal function.

In such nitrogen oxide removal equipment, the gas supplied to the nitrogen oxide absorption means is preferably humidified.

Further, a conventional nitrogen oxide removal equipment uses a humidifying means provided separately from the removal equipment to humidify the gas. Accordingly, the removal equipment and the humidifying means need to be interconnected with a piping duct for interconnection and this causes a problem in that installation spaces for the humidifying means and the piping duct for connection need to be secured before the installation of the removal equipment. There are also problems in that a pressure required to pass gas through the removal equipment is lost in the piping duct and the installation of the piping duct for interconnection is troublesome.

Patent Document 1: Japanese Laid-Open Patent Publication No. 211427/1998
Patent Document 2: Japanese Laid-Open Patent Publication No. 9957/1999
Patent Document 3: Japanese Laid-Open Patent Publication No. 259798/2001

DISCLOSURE OF THE INVENTION

Problems to be Solved by the Invention

The present invention has been completed to improve inconvenience of the above-described prior art, and relates to a method and an equipment for removing nitrogen oxide contained in gas. In particular, an object of the present invention is to provide a method capable of effectively removing nitrogen oxide contained in air, and a nitrogen oxide removal equipment capable of being used suitably in the execution of the above removing method.

Means for Solving the Problems

According to the present invention, there is provided a nitrogen oxide removal equipment comprising a nitrogen oxide absorption means provided with an absorption unit for removing the nitrogen oxide contained in gas by passing the gas through solid absorbent layers. The absorption unit is surrounded by a boundary wall of a storage part, a bottom panel of a storage part and an upper portion of an outlet side, and has an absorbent storage part provided therein with the solid absorbent layers and a low-profile unit body provided with a gas rectification part for rectifying gas passing through the solid absorbent layers. The unit body comprises: an intake side surface; an outlet side surface having the upper portion of the outlet side and the lower portion of the outlet side and disposed opposite to the intake side surface; the boundary wall of the storage part disposed between the intake side surface and the outlet side surface; the bottom panel of the storage part disposed horizontally from the lower end of the boundary wall of the storage part to the upper portion of the outlet side; the bottom of the rectification part disposed horizontally below the boundary of the outlet side, i.e., the boundary between the upper portion of the intake side and the lower portion of the outlet side; the bottom panel of the intake side extending from the intake side surface to the bottom of the rectification part; and the bottom panel of the outlet side extending from the outlet side boundary to the bottom of the rectification part.

According to the present invention, the intake side surface may have the upper portion of the intake side and the lower portion of the intake side, the bottom of the rectification part may be disposed lower than the boundary of the input side, i.e., the boundary between the upper portion of the intake side and the lower portion of the intake side, and the bottom panel of the intake side may extend from the boundary of the intake side to the bottom of the rectification part. In the nitrogen oxide absorption means according to the present invention, a plurality of absorption units may be laminated integrally in the vertical direction, and the unit body may be separated from the gas rectification part by the bottom of the rectification part, the bottom panel of the intake side and the bottom panel of the outlet side. The unit body may be provided with a rectification part for a lower-stage unit to be the gas rectification part of another absorption unit disposed below the laminated absorption units. Further, the lower portion of the intake side may be provided with an intake of gas to the rectification part for the lower-stage unit, and the lower portion of the outlet side may be provided with an outlet of gas from the rectification part for the lower-stage unit. According to the present invention, the bottom panel of the intake side can be inclined against the upper portion of the intake side at an angle θ of 90 to 180 degrees.

Further, the ratio of A:B is preferably in the range of 1:1 to 1:10, where A represents a distance from the boundary between the bottom of the rectification part and the bottom panel of the outlet side to the bottom panel of the storage part while B represents a distance from the same boundary to the outlet side surface. According to the present invention, the bottom of the rectification part can be overlapped with the boundary wall of the storage part in a plane. According to the present invention, the absorption units can be laminated so that the bottom of the rectification part of the absorption unit disposed above are overlapped with the upper end of the boundary wall of the storage part of the absorption unit disposed below. Furthermore, according to the present invention, in case that the removal function of the solid absorbent layer is deteriorated, a regenerant supplying means is provided to supply a regenerant to the nitrogen oxide absorption means so that the nitrogen oxide absorbed by the solid absorbent layer is removed by the regenerant to regenerate the deteriorated removal function. The absorbent storage part and the gas rectification part may have water-tightness. Furthermore, the regenerant supplying means may be capable of supplying the regenerant individually to each absorption unit. The regenerant may contain a sulfur-containing compound selected from the group consisting of alkali metal hydroxide, alkali earth metal hydroxide, lithium sulfite, sodium sulfite, potassium sulfite, calcium sulfite, magnesium sulfite, iron sulfite, copper sulfite, lithium thiosulfate, sodium thiosulfate, potassium thiosulfate, calcium thiosulfate, magnesium thiosulfate, and a mixture thereof.

Further, according to the present invention, there is provided a nitrogen oxide removal equipment for removing nitrogen oxide contained in gas, comprising: an absorption unit provided with the solid absorbent layers constituting a nitrogen oxide absorption means each of which consisting of a plurality of low-profile solid absorbents; and gas rectification means for supplying the gas to the large-area side of the low-profile solid absorbent layers of the absorption units.

According to the present invention, there is further provided a method for removing nitrogen oxide contained in gas, comprising the steps of: introducing the gas into the large-area side of the low-profile solid absorbent layers of the absorption unit via a gas rectification unit for supplying the gas, the absorption unit being provided with the solid absorbent layers constituting the nitrogen oxide absorption means each of which consisting of a plurality of low-profile absorbents; and selectively removing the nitrogen oxide with the solid absorbents.

According to the present invention, there is furthermore provided a method for removing nitrogen oxide contained in gas, comprising the steps of: removing the nitrogen oxide contained in the air by supplying the gas to a nitrogen oxide absorption means including low-profile solid absorbents for removing nitrogen oxide by absorbing the same via gas rectification means for selectively supplying the gas to the large-area side of the low-profile solid absorbents; and regenerating a nitrogen oxide removal function of the nitrogen oxide absorption means, which has been deteriorated during the above removing step, by using a regenerant containing a basic substance or a reducing substance.

The nitrogen oxide removal method according to the present invention comprises the step of detecting the removal function with a nitrogen oxide sensor. When deterioration of the removal function is detected in the above detecting step, the aforementioned regenerating step can be carried out. The regenerant can be circulated between the nitrogen oxide absorption equipment and a regenerant tank for storing the regenerant. The nitrogen oxide removal method according to the present invention may further comprise the preprocessing step of turning the nitrogen oxide contained in the gas into nitrogen dioxide, dinitrogen trioxide, dinitrogen tetroxide or dinitrogen quintoxide. The gas may be assumed to be air collected in a tunnel of a road, a canal/an underpath, a shelter of a road, a parking area, nearby a road, or at a bus stop. The basic substance may be alkali metal hydroxide or alkali earth metal hydroxide. The reducing substance may be a sulfur-containing compound selected from the group consisting of lithium sulfite, sodium sulfite, potassium sulfite, calcium sulfite, magnesium sulfite, iron sulfite, copper sulfate, lithium thiosulfate, sodium thiosulfate, potassium thiosulfate, calcium thiosulfate, magnesium thiosulfate, or a mixture thereof. When the regenerant contains a reducing substance, the removal function can be regenerated in a nitrogen atmosphere.

Further, according to the present invention, there is provided a nitrogen oxide removal equipment for removing nitrogen oxide contained in gas, comprising: a nitrogen oxide absorption means containing low-profile solid absorbents for removing nitrogen oxide by absorption; gas rectification means for selectively supplying the gas to the large-area side of the low-profile solid absorbents; and a regenerant supplying means for supplying a regenerant containing a basic substance or a reducing substance to the nitrogen oxide absorption means when the nitrogen oxide removal function thereof is deteriorated so that the deteriorated removal function is regenerated by removing the nitrogen oxide absorbed in the solid absorbents by using the regenerant.

The nitrogen oxide removal equipment according to the present invention may include a nitrogen oxide sensor for detecting the removal function so as to regenerate the removal function when the nitrogen oxide sensor detects nitrogen oxide of a predetermined concentration or higher. The nitrogen oxide removal equipment according to the present invention may further include a regenerant tank for storing the regenerant, and the regenerant may be circulated between the regenerant tank and the nitrogen oxide absorption equipment. The nitrogen oxide removal equipment according to the present invention may furthermore include a preprocessing means for turning the nitrogen oxide contained in the gas into nitrogen dioxide, dinitrogen trioxide, dinitrogen quadroxide or dinitrogen quitoxide so as to supply gas after passing through the preprocessing means to the nitrogen oxide absorption equipment.

According to the present invention, there is furthermore provided a nitrogen oxide removal equipment for removing nitrogen oxide contained in gas, comprising: a plurality of absorption units for removing the nitrogen oxide contained in the gas by passing the gas through low-profile solid absorbent layers through a rectification means for introducing the gas into the large-area side of the low-profile solid absorbent layers; and a space-saving type nitrogen oxide absorption means formed by laminating and integrating the plurality of absorption units for removing the nitrogen oxide contained in the gas in the direction intersecting the extension direction of the solid absorbent layers.

According to the present invention, each of the absorption units may be provided with a control means for controlling a flowing rate of gas passing through the solid absorbent layers. According to the present invention, in case that the removal function of the solid absorbent layer is deteriorated, there may be provided a regenerant supplying means for supplying the regenerant to the nitrogen oxide absorption means to regenerate the deteriorated removal function by removing the nitrogen oxide absorbed in the solid absorbent layer by using the regenerant. The regenerant supplying means may be capable of supplying the regenerant individually to each absorption unit. The nitrogen oxide removal equipment may be provided with a preprocessing means for turning the nitrogen oxide contained in the gas into nitrogen dioxide, dinitrogen trioxide, dinitrogen quadroxide or dinitrogen quitoxide so as to supply the gas after passing through the preprocessing means to the nitrogen oxide absorption means.

Furthermore, the regenerant may contain a sulfur-containing compound selected from the group consisting of alkali metal hydroxide, alkali earth metal hydroxide, lithium sulfite, sodium sulfite, potassium sulfite, calcium sulfite, magnesium sulfite, iron sulfite, copper sulfite, lithium thiosulfate, sodium thiosulfate, potassium thiosulfate, calcium thiosulfate, magnesium thiosulfate and a mixture thereof.

According to the present invention, there is further provided a nitrogen oxide removal equipment for removing nitrogen oxide contained in gas, comprising: a humidifying means for humidifying the gas; and a nitrogen oxide absorption means for removing the nitrogen oxide contained in the gas by passing the gas through the low-profile solid absorbent layers through a gas rectification means for introducing the gas into the large-area side of the low-profile solid absorbent layers, wherein the humidifying means is integrated with the nitrogen oxide absorption means so as to overlap with the solid absorbent layers, and the gas after passing through the humidifying means is supplied to the nitrogen oxide absorption equipment.

The nitrogen oxide removal equipment according to the present invention is provided with a water tank for storing humidifying water. When a regenerant is supplied onto the solid absorbent layers, the regenerant after passing through the solid absorbent layers is supplied to the water tank. The solid absorbent layer is formed of solid absorbents containing a carbon material. The regenerant may contain a sulfur-containing compound selected from the group consisting of alkali metal hydroxide, alkali earth metal hydroxide, lithium sulfite, sodium sulfite, potassium sulfite, calcium sulfite, magnesium sulfite, iron sulfite, copper sulfite, lithium thiosulfate, sodium thiosulfate, potassium thiosulfate, calcium thiosulfate, magnesium thiosulfate or a mixture thereof.

DESCRIPTION OF THE REFERENCE NUMERALS

Figure 1:
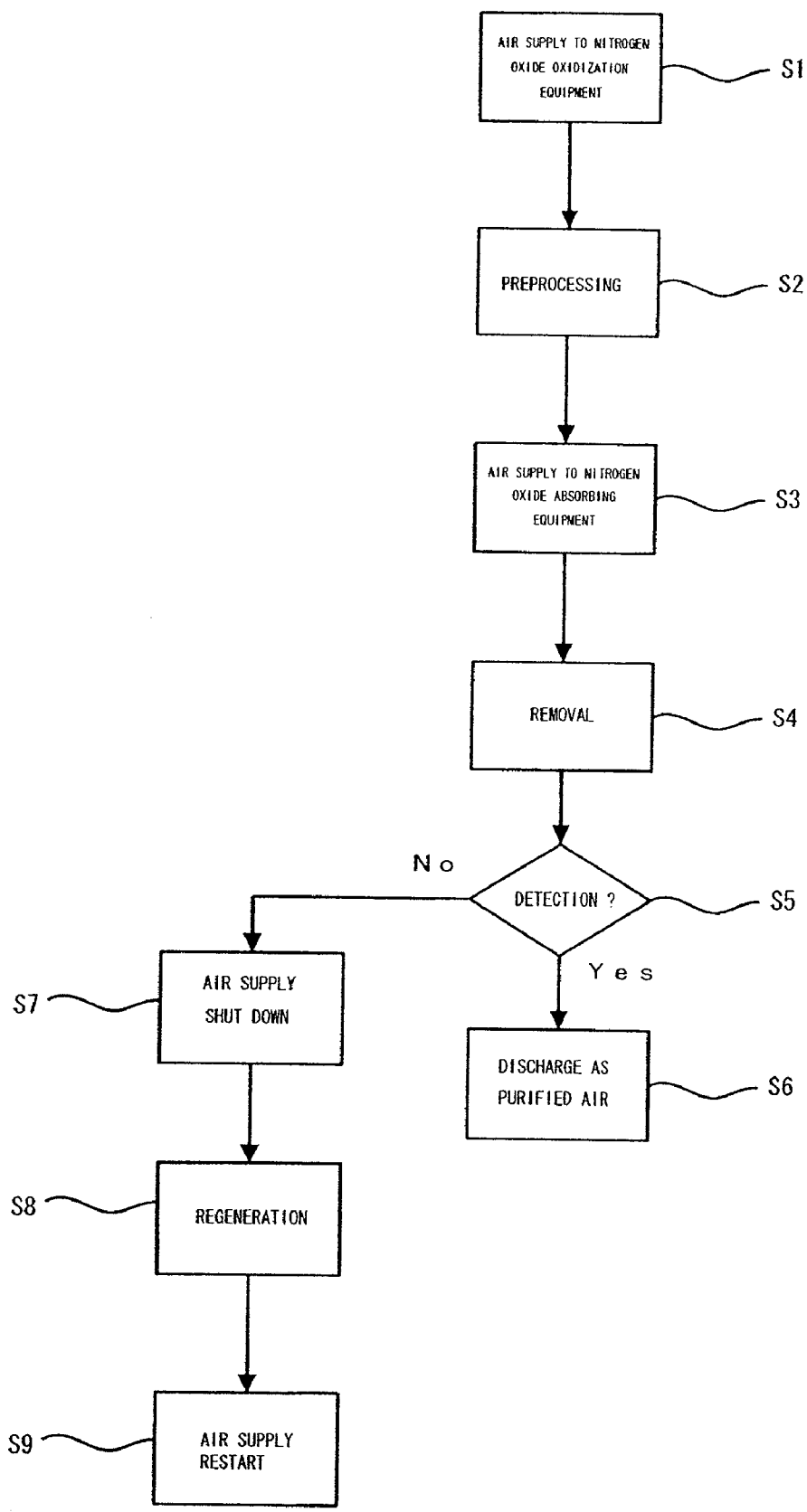
FIG. 1 A flowchart for explaining a method for removing nitrogen oxide according to the present invention.

1: Air supply line
2: Nitrogen oxide oxidization equipment
3: Air supply line
4: Nitrogen oxide absorption equipment
5: Air exhaust line
6: Regenerant tank
7: Regenerant supply line
8: Regenerant return line
10: Control equipment
14: Nitrogen oxide absorption equipment
15: Nitrogen oxide sensor
31: Air supply line
41, 42, 43: Nitrogen oxide absorption equipments 44: Interconnection member
45: Support member
51: Air exhaust line
61, 62: Regenerant tanks
71, 72: Regenerant supply lines
81, 82: Regenerant return lines
91: Humidifying means
92: Preprocessing means
93: Pressure feed fan
94: Nitrogen oxide absorption means
94a: Absorption unit
95: Solid absorbent layer
96: Control fan
97: Regenerant tank
98: Regenerant supply line
99: Valve
100: Nitrogen oxide absorption means
101: main body
102: Spray pipe
104: Water tank
103: Filling-up layer
105: Water supply line
106: Supply valve
107: Absorbent storage part
108: Gas rectification part
109: Exhaust valve
110: Rectification part for lower-stage unit
111: Unit body
112: Intake side surface
113: Outlet side surface
114: Side surface
115: Bottom of rectifier
117: Exhaust port

MOST PREFERRED EMBODIMENT FOR CARRYING OUT INVENTION

Section A: Nitrogen Oxide Removal Material and Basic Equipment Structure

Figure 2:
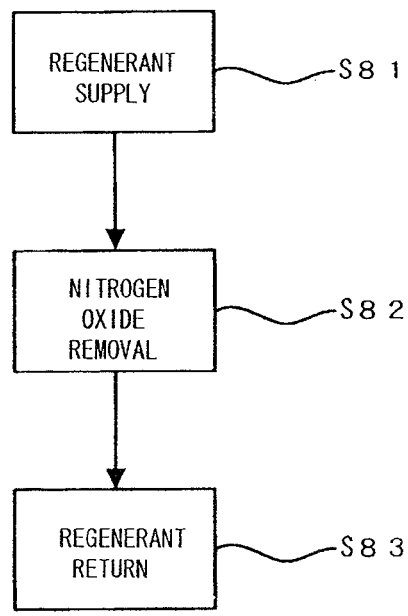
FIG. 2 A flowchart of for explaining the method for removing nitrogen oxide according to the present invention.
Figure 3:
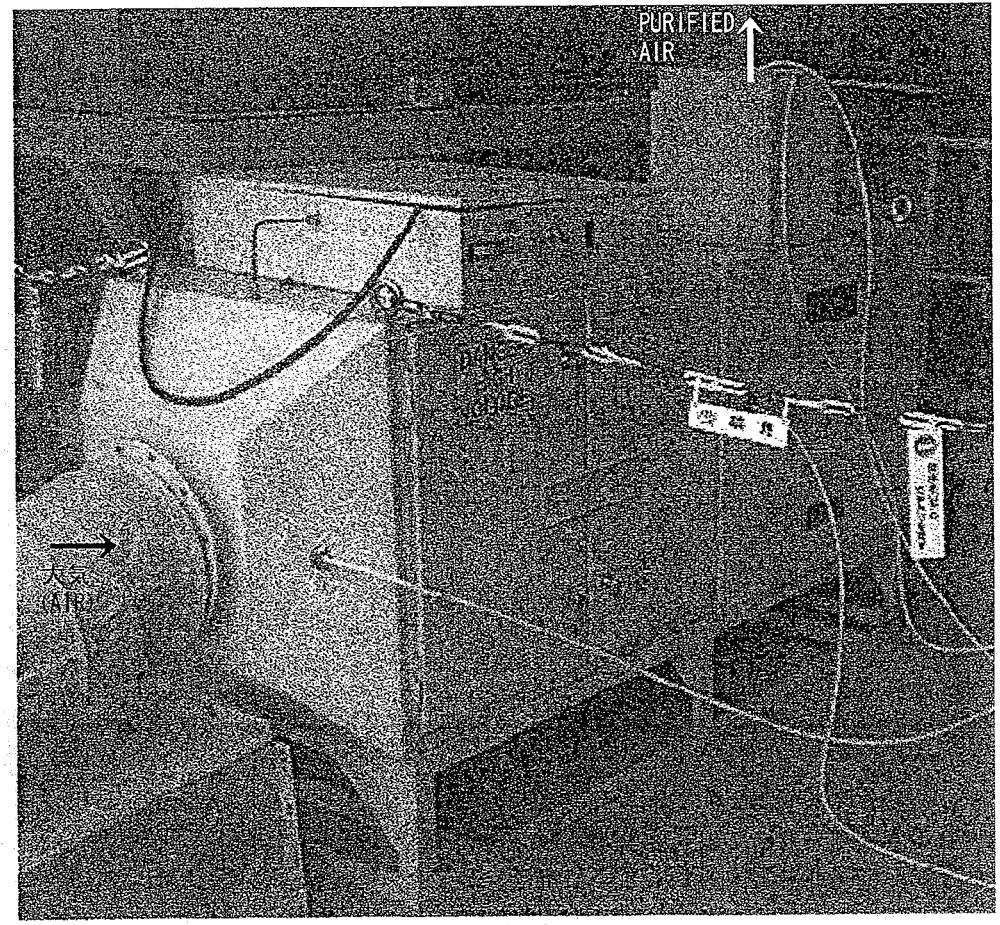
FIG. 3 A photograph showing an embodiment of a nitrogen oxide removal equipment according to the present invention.

The present invention will be described in detail hereunder with reference to the accompanying drawings. FIGS. 1 and 2 are flowcharts of assistance in explaining a basic structure of a method for removing nitrogen oxide according to the present invention. Further, FIG. 3 is a photograph showing a basic structure of a nitrogen oxide removal equipment according to the present invention, and FIG. 4 is a schematic illustration of assistance in explaining the basic structure of the nitrogen oxide removal equipment according to the present invention.

First, the nitrogen oxide removal equipment according to the present invention will be described in detail. The nitrogen oxide removal equipment shown in FIG. 4 comprises: a supply line 1 for supplying air collected to remove nitrogen oxide therefrom to a nitrogen oxide oxidization equipment 2; the nitrogen oxide oxidization equipment 2; an air supply line 3 for supplying the air after passing through the nitrogen oxide oxidization equipment 2 to a nitrogen oxide absorption equipment 4; the nitrogen oxide absorption equipment 4 for absorbing nitrogen oxide; and an air exhaust line 5 for discharging the air after passing through the nitrogen oxide absorption equipment 4 as purified air.

Figure 4:
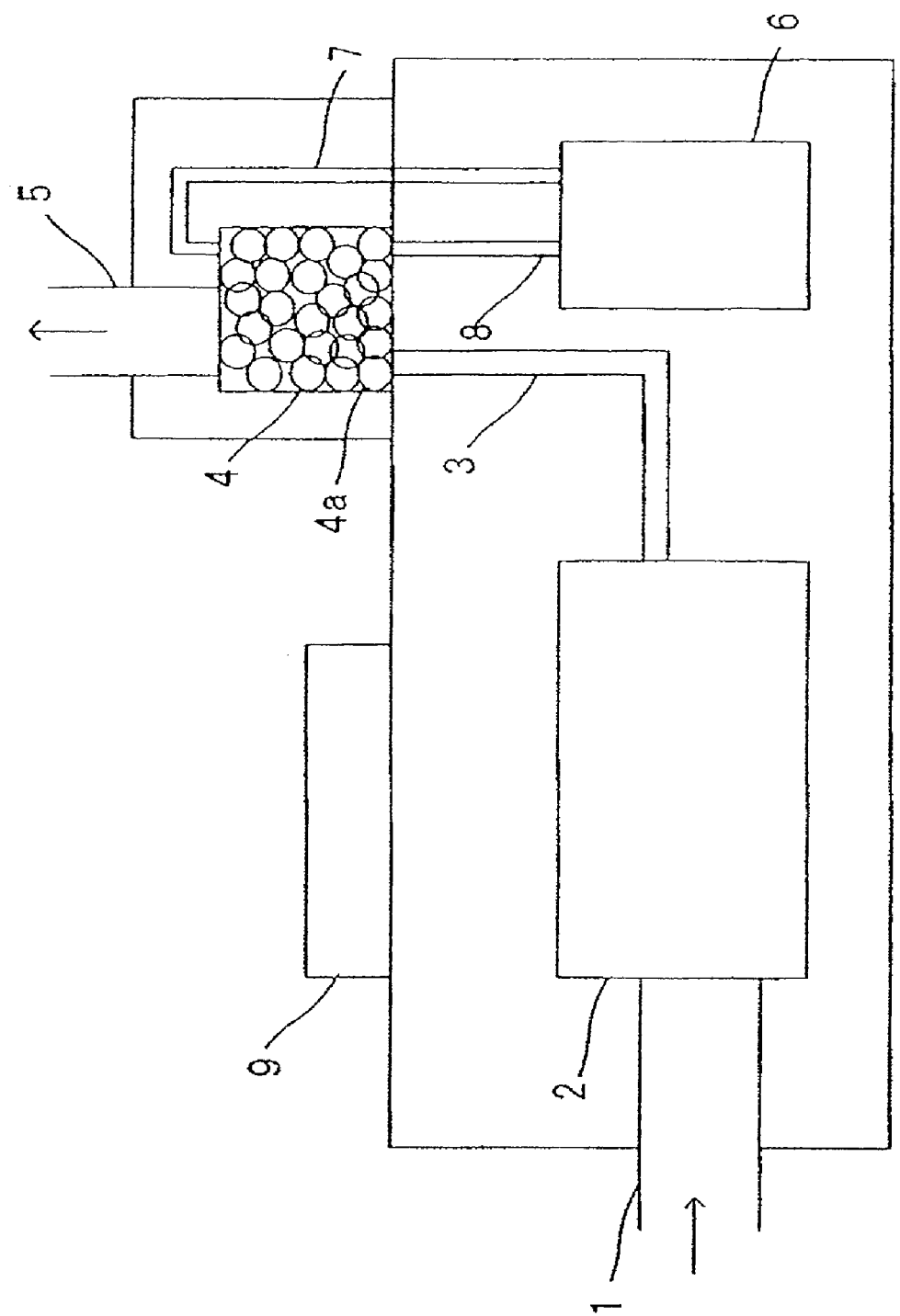
FIG. 4 A schematic illustration for explaining one example of the nitrogen oxide removal equipment according to the present invention.

Further, the air exhaust line 5 shown in FIG. 4 is provided therein with a nitrogen oxide sensor. The nitrogen oxide sensor detects a nitrogen oxide removal function of the nitrogen oxide absorption equipment 4 to control a concentration of nitrogen oxide contained in purified air discharged from the air exhaust line 5. Furthermore, the nitrogen oxide removal equipment shown in FIG. 4 is provided with a regenerant supply means comprising a regenerant tank 6 for storing regenerant, a regenerant supply line 7 for supplying regenerant from the regenerant tank 6 to the nitrogen oxide absorption equipment 4, and a regenerant return line 8 for returning regenerant after passing through the nitrogen oxide absorption equipment 4 from the nitrogen oxide absorption equipment 4 to the regenerant tank 6, so that regenerant can be circulated between the regenerant tank 6 and the nitrogen oxide absorption equipment 4 via the regenerant supply line 7 and the regenerant return line 8.

When the nitrogen oxide sensor detects nitrogen oxide of a predetermined concentration or a higher concentration, the nitrogen oxide removal function of the nitrogen oxide removal equipment is regenerated.

The structure of the supply line 1 is not particularly limited so far as the same can supply air to the nitrogen oxide oxidization equipment 2. Further, if necessary, the supply line 1 is equipped with a dust collector for preventing the nitrogen oxide absorption equipment 4 from clogging and an equipment for controlling a flowing rate and a flowing amount of air supplied to the nitrogen oxide oxidization equipment 2 etc.

The nitrogen oxide oxidization equipment 2 oxidizes nitrogen oxide contained in air into nitrogen dioxide, dinitrogen trioxide, dinitrogen quadroxide or dinitrogenquintoxide. The shape of the nitrogen oxide oxidation equipment 2 is not particularly limited, but is preferably an equipment for carrying out oxidization by ozone generation capable of effectively oxidizing nitrogen oxide of a low concentration. A temperature of the nitrogen oxide oxidization equipment 2 is not necessarily controlled, and can be left to a temperature supplied via the air supply line 1.

The nitrogen oxide absorption equipment 4 is for absorption of nitrogen oxide, and uses filling-up layers formed by filling containers with solid absorbents 4a for absorbing nitrogen oxide. The filling-up layer filled with the solid absorbents 4a is not particularly limited, but a layer having a structure capable of passing air therethrough with a few pressure loss is preferably used.

The solid absorbents 4a is preferably formed of crushed particles or formed particles having a diameter of several millimeters to several centimeters or particles having a honeycomb structure from the viewpoint of suppressing a pressure loss. Furthermore, the solid absorbents 4a preferably has a large specific surface area from the viewpoint of efficient absorption of nitrogen oxide of a low concentration. Further, the solid absorbents 4a used in the nitrogen oxide absorption equipment 4 may be one type, but two or more types of the solid absorbents 4a may be mixed in use. Specific examples of materials constituting the solid absorbents 4a include a carbon material and an inorganic material. Specific examples of the carbon materials usable herein include coconut husk active charcoal, charcoal made of pitch, charcoal made of PAN, carbon fibers, charcoal, fullerene, and carbon nanotubes etc. Specific examples of the inorganic materials usable herein include active white clay, alumina, zeolite, silica, magnesia and titania. An example of a particularly preferable material of the solid absorbents 4a is a carbon material having a large specific surface area such as an active charcoal.

Further, a structure of a container filled with the solid absorbents 4a is not particularly limited so far as the same can prevent leakage of air and resist a solid pressure from the solid absorbents 4a and a liquid pressure of a regenerant used in cleaning and regenerating the solid absorbents 4a. Furthermore, a material of the container filled with the solid absorbents 4a is neither particularly limited, and specific examples of the materials usable herein include soft steel, stainless steel, FRP, and PCV etc.

Further, like the nitrogen oxide oxidization equipment 2, a temperature of the nitrogen oxide absorption equipment 4 is neither necessarily controlled, and can be left to a temperature supplied via the air supply line 3. In the nitrogen oxide removal equipment shown in FIG. 4, a humidity of air supplied via the air supply line 3 is preferably not less than 40%, more preferably not less than 60%, most preferably not less than 80% in order to effectively absorb nitrogen oxide. A humidity of air supplied to the nitrogen oxide absorption equipment 4 may be controlled using any method or equipment, for example, and a method for raising a humidity by spraying water in air etc. may be suitably used.

Furthermore, in the nitrogen oxide removal equipment shown in FIG. 4, a control equipment 9 is used to control the humidity for effective absorption of nitrogen oxide so that a spatial rate of air supplied to the nitrogen oxide absorption equipment 4 is 1,000 to 200,000 $h^{-1}$, more preferably 3,000 to 100,000 $h^{-1}$. The spatial rate of the air supplied to the nitrogen oxide absorption equipment 4 is determined in accordance with a concentration of nitrogen oxide contained in the air to be removed, a type of the solid absorbents 4a, a size of the nitrogen oxide absorption equipment 4 and the like. In addition, a type of the control equipment 9 is not particularly limited so far as the same can control a spatial rate of air supplied to the nitrogen oxide absorption equipment 4.

The removal function of the nitrogen oxide absorption equipment 4 is gradually deteriorated as the solid absorbents 4a reach absorption breakthrough by nitrogen oxide. In the nitrogen oxide removal equipment shown in FIG. 4 however, the nitrogen oxide absorption equipment 4 is regenerated by removing nitrogen oxide from the solid absorbents 4a, which have reached absorption breakthrough, by using a regenerant. An aqueous solvent containing a basic substance or a reducing substance is used as the regenerant.

The basic substance usable herein is not particularly limited, but specific examples thereof include alkali metal hydroxide, alkali earth metal hydroxide, alkali metal carbonate and alkali earth metal carbonate. Alkali metal hydroxide or alkali earth hydroxide, which is a strongly-basic substance, is particularly preferably used from the viewpoint of effective removal of nitrogen oxide absorbed by the solid absorbents.

Specific examples of alkali metal hydroxide include lithium hydroxide, sodium hydroxide and potassium hydroxide. Specific examples of alkali metal carbonate include calcium hydroxide, sodium hydroxide and potassium hydroxide. Specific examples of alkali earth metal carbonate include calcium carbonate and magnesium carbonate.

Further, the reducing substance is not particularly limited, but specific examples thereof include sulfite salt, thiosalfate salt, hydride, hydrogen sulfate and aldehyde, and sulfite salt is preferably used from the viewpoint of reduction of nitrogen oxide into nitrogen gas at a room temperature.

Specific examples of sulfite salts include lithium sulfite, sodium sulfite, potassium sulfite, calcium sulfite, magnesium sulfite, iron sulfite and copper sulfite. Specific examples of thiosulfate salts include lithium thiosulfate, sodium thiosulfate, potassium thiosulfate, calcium thiosulfate and magnesium thiosulfate. Specific examples of hydrades include boron sodium hydride and aluminum lithium hydride. Specific examples of aldehydes include formaldehyde and acetoaldehyde.

Further, when a reducing substance is used as a regenerant, the inside of the regenerant tank is preferably subjected to nitrogen substitution to prevent a reducing substance from deterioration by oxygen or the like. Furthermore, when the nitrogen oxide absorption equipment 4 is regenerated, the inside of the nitrogen oxide absorption equipment is also preferably subjected to nitrogen substitution in addition to the inside of the regenerant tank 6.

The regenerant can be used once or a plurality of times by being prepared taking into consideration a type and an amount of nitrogen oxide in air to be supplied to the nitrogen oxide absorption equipment 4 and a concentration of the regenerant.

Next, a method for removing nitrogen oxide contained in air by using the above nitrogen oxide removal equipment will be described in detail.

Air containing nitrogen oxide to be removed by the method described below is not particularly limited and specific examples thereof include air collected in a tunnel of a road, an underground parking area, or nearby an urban trunk road, which contains therein nitrogen oxide having a concentration of not more than few ppm causing a problem. Further, the humidity of air containing nitrogen oxide is preferably not less than 60%, more preferably not less than 80%. Furthermore, the removal equipment according to the present invention can be generally installed in a tunnel of a road, a canal/an underpath, a shelter of a road, nearby a road, nearby or adjacent to a bus stop or the like to take polluted air thereinto.

In order to remove nitrogen oxide from the air containing such nitrogen oxide, the air containing the nitrogen oxide is first supplied to the nitrogen oxide oxidization equipment 2 via the air supply line 1 as shown in FIG. 1 (S1) and then the nitrogen oxide in the air is turned into nitrogen dioxide, dinitrogen trioxide, dinitrogen quadroxide or dinitrogen quitoxide (S2). Subsequently, the air after passing through the nitrogen oxide oxidization equipment 2 is supplied to the nitrogen oxide absorption equipment 4 via the air supply line 3 (S3) and then the nitrogen oxide in the air is absorbed and removed by the solid absorbents 4a (S4). Thereafter, the air after passing through the nitrogen oxide absorption equipment 4 is discharged as purified air via the air exhaust line 5 (S6).

At this time, when the nitrogen oxide sensor installed in the air exhaust line 5 detects nitrogen oxide of a predetermined concentration or higher (S4), the supply of the air containing the nitrogen oxide from the air supply line 1 is shut down (S7) and the nitrogen oxide absorption equipment 4 described below is regenerated while the air supply is shut down (S8).

In order to regenerate the nitrogen oxide absorption equipment 4, a regenerant is first supplied to the nitrogen oxide absorption equipment 4 from the regenerant tank 6 via the regenerant supply line 7 as shown in FIG. 2 (S81) and then nitrogen oxide is removed from the solid absorbents 4a (S82). Nitrogen oxide is removed using the regenerant by immersing the solid absorbents 4a in the regenerant within the nitrogen oxide absorption equipment 4, or spraying the regenerant onto the solid absorbents 4a. Subsequently, the used regenerant is returned to the regenerant tank 6 of the solid absorbents 4a via the regenerant return line 8 (S83), thereby completing the regeneration of the nitrogen oxide absorption equipment 4.

When the regeneration of the nitrogen oxide absorption equipment 4 is thus completed, the supply of air containing nitrogen oxide from the air supply line 1 is restarted (S9). Thereafter, the above step is repeated until whole air containing nitrogen oxide is discharged as purified air, and then the removal of the nitrogen oxide contained in the air is completed.

In the above method and equipment for removing nitrogen oxide, nitrogen oxide contained in air is removed by supplying the air to the nitrogen oxide absorption equipment 4 containing the solid absorbents 4a, and the nitrogen oxide removal function is regenerated by removing the nitrogen oxide absorbed by the solid absorbents 4a, thereby removing effectively the nitrogen oxide contained in the air.

In addition, in the method and the equipment for removing nitrogen oxide according to the present invention, the nitrogen oxide absorption equipment 4 may be regenerated when nitrogen oxide of a predetermined concentration or higher is detected by the nitrogen oxide sensor as described in the aforementioned example, but may also be regenerated at predetermined intervals. For example, when the method and the equipment for removing nitrogen oxide according to the present invention are continuously applied for a long period of time, the nitrogen oxide absorption equipment 4 may be regenerated at a cycle of once in one day, once in one week or the like taking into consideration the easiness of maintenance.

FIG. 3 is a view showing a structure of a nitrogen oxide removal equipment having a basic structure shown in FIG. 4. FIG. 3 shows the structure, wherein air containing nitrogen oxide having an adjusted humidity is first introduced into the nitrogen oxide oxidization equipment 2 to oxidize the nitrogen oxide and, specifically in a preferred embodiment, ozone is generated by electric discharge caused by application of a high voltage to collect dust and oxidize the nitrogen oxide. Thereafter, the gas is introduced into the nitrogen oxide absorption equipment 4, the nitrogen oxide is removed, and then purified air is exhausted into air via the air exhaust line 5. In addition, the nitrogen oxide absorption equipment 4 is provided therein with the regenerant tank 6, the regenerant supply line 7, the regenerant return line 8 and the like (all not shown) which are accommodated integrally in a cabinet.

Figure 5:
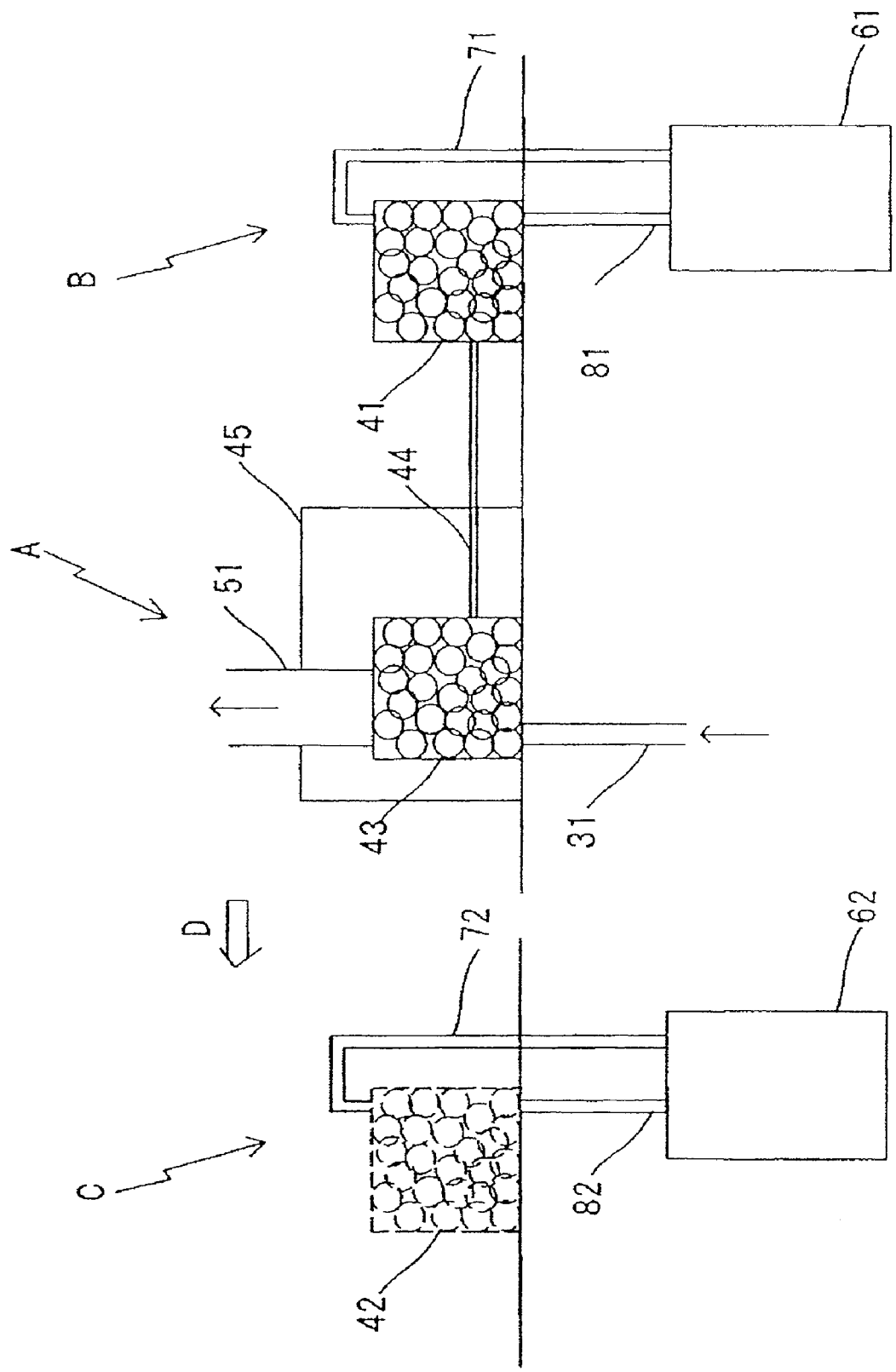
FIG. 5 A schematic illustration for explaining another example of the nitrogen oxide removal equipment according to the present invention.

Further, in the method and the equipment for removing nitrogen oxide according to the present invention, a plurality of sets of nitrogen oxide absorption equipments may be provided. FIG. 5 is a schematic illustration showing one example of a nitrogen oxide removal equipment provided with two nitrogen oxide absorption equipments. In addition, the nitrogen oxide removal equipment shown in FIG. 5 is the same as that shown in FIG. 4 except for the nitrogen oxide absorption equipments 41, 43 and the periphery thereof. Therefore, portions other than the nitrogen oxide absorption equipments 41, 43 and the periphery thereof are omitted in FIG. 5.

A nitrogen oxide removal equipment shown in FIG. 5 is provided with an area A for removing nitrogen oxide and areas B and C for regenerating a nitrogen oxide absorption equipment. Air is supplied from an air supply line 31 to a nitrogen oxide absorption equipment 43 disposed in the area A for removing nitrogen oxide in such a manner supported by a support member 45. Thereafter, the air after passing through the nitrogen oxide absorption equipment 43 is discharged from an air exhaust line 51. Further, a regenerant is supplied from a regenerant tank 61 to a nitrogen oxide absorption equipment 41 interconnected and integrated with the nitrogen oxide absorption equipment 43 by an interconnection member 44 via a regenerant supply line 71, and the regenerant after passing through the nitrogen oxide absorption equipment 41 is returned to the regenerant tank 61 via a regenerant return line 81.

Further, when the nitrogen oxide absorption equipment 43 is regenerated, the nitrogen oxide absorption equipment 43 moves in the direction indicated by an arrow D and disposed in the area C for removing nitrogen oxide, and, at the same time, the nitrogen oxide absorption equipment 41 is disposed in the area A for removing nitrogen oxide. In addition, in FIG. 5, the nitrogen oxide absorption equipment 43 disposed in the area C is indicated by dotted lines and represented by a numeral 42. Further, a regenerant is supplied from a regenerant tank 62 to a nitrogen oxide absorption equipment 42 via a regenerant supply line 72, and the regenerant after passing through the nitrogen oxide absorption equipment 42 is returned to the regenerant tank 62 via a regenerant return line 82.

When nitrogen oxide is removed using a nitrogen oxide removal equipment shown in FIG. 5, the nitrogen oxide absorption equipment 41 is regenerated while the nitrogen oxide absorption equipment 43 is removing nitrogen oxide.

When a plurality of nitrogen oxide absorption equipments are thus provided, while at least one of the nitrogen oxide absorption equipments is removing nitrogen oxide, other nitrogen oxide absorption equipments can be regenerated so as to simultaneously carry out the removal of nitrogen oxide and the regeneration of the nitrogen oxide absorption equipments to make it possible of continuous and efficient removal of nitrogen oxide. In addition, regenerant supply means to be installed in the case where a plurality of nitrogen oxide absorption equipments are provided may be two or more as shown in the example of FIG. 5 or one. Further, a plurality of nitrogen oxide absorption equipments may be interconnected as shown in the example of FIG. 5 or may not be interconnected, or each nitrogen oxide absorption equipment may be movable between an area for removing nitrogen oxide and an area for regenerating a nitrogen oxide absorption equipment.

Furthermore, when the nitrogen oxide absorption equipment 4 is compact, solid absorbents may be made a detachable low-profile cassette so that nitrogen oxide can be removed from the solid absorbents by a method of immersing the detached cassette of the solid absorbents into a regenerant. Further, by filling the detachable cassette with the solid absorbents, the solid absorbents can be replaced easily when there is a necessity of replacing the solid absorbents.

Furthermore, as described in the above example, air containing nitrogen oxide is preferably supplied to the nitrogen oxide absorption equipment 4 after passing through the nitrogen oxide oxidization equipment 2. However, when there is no problem even though nitrogen oxide contained in air is removed at a low rate or when nitrogen oxide contained in air is formed of one or more gases selected from the group consisting of nitrogen dioxide, dinitrogen trioxide, dinitrogen quadroxide and dinitrogen quintoxide, the air supply line 1 may be connected directory to the air supply line 3 to make it possible of supplying the air containing nitrogen oxide to the nitrogen oxide absorption equipment 4 without via the nitrogen oxide oxidization equipment 2.

Figure 6:
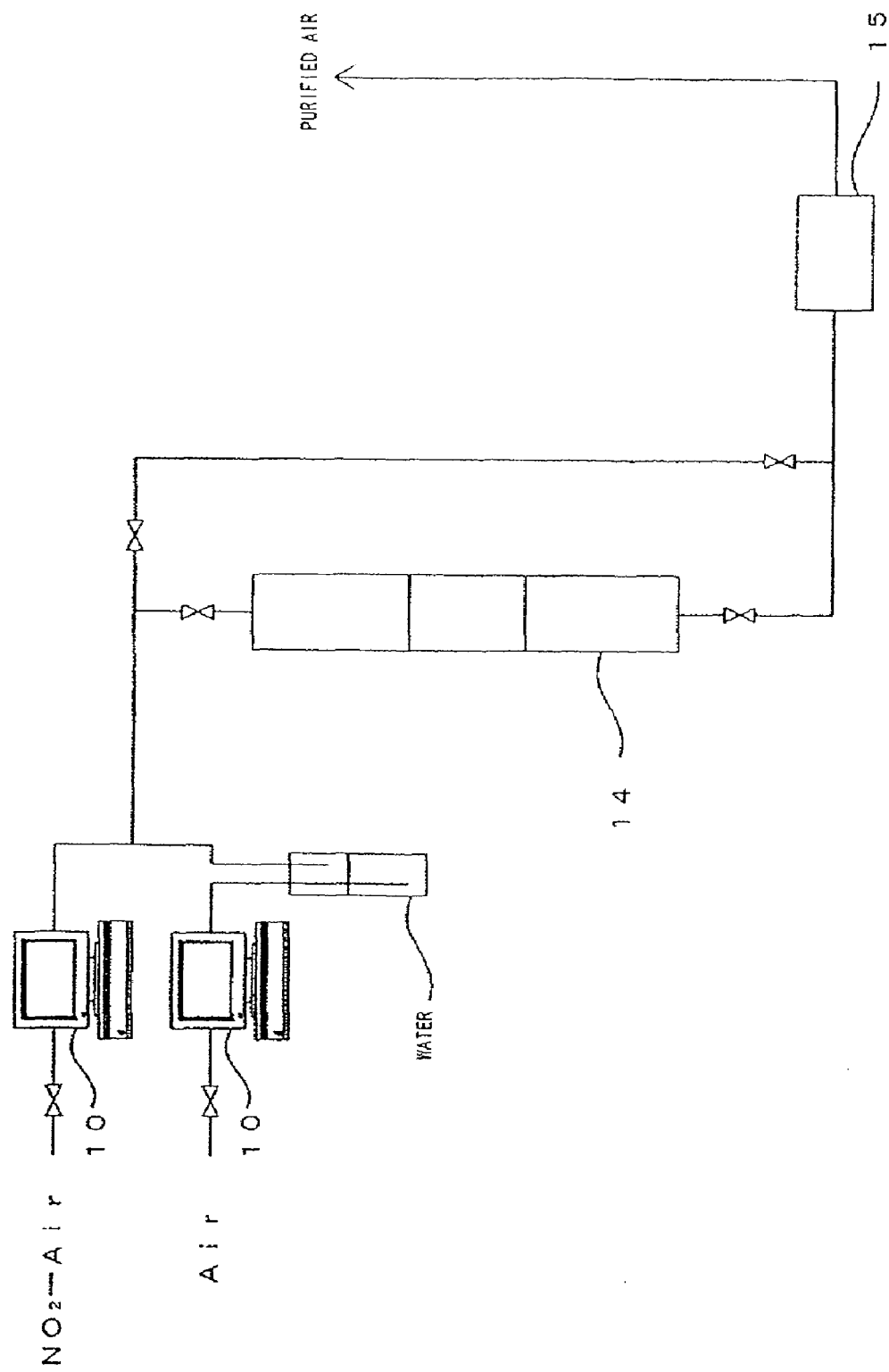
FIG. 6 A view showing an equipment used to measure an efficiency of absorption of nitrogen oxide and regeneration of a removal function according to the present invention.

A simplified equipment shown in FIG. 6 was constructed to carry out the following test for confirmation of efficiencies of the absorption and regeneration steps according to the present invention.

In the test, a control equipment 10 was used to control a nitrogen oxide absorption equipment 14 obtained by filling 1 ml (0.43 g) of solid absorbents made of coconut husk active charcoal (manufactured by Nacalai Tesque, Inc.) into a glass container having an inner diameter of 16 mm, thereby flowing the air containing 1 ppm of nitrogen dioxide at a temperature of 25° C. and a humidity of 100% at a spatial rate of 4,800 $h^{-1}$ to 4,800 $h^{-1}$, and a removal rate of nitrogen oxide was obtained from the concentration of nitrogen oxide detected by a nitrogen oxide sensor 15.

Subsequently, after 32 h from the time at which the removal rate of nitrogen oxide became 70%, solid absorbents in the nitrogen oxide absorption equipment 14 was immersed in 10 ml of a regenerant (aqueous solution containing 1% of sodium sulfite) for 30 minutes to regenerate the solid absorbents. Thereafter, air flowing was restarted, solid absorbents were regenerated in the same manner as in the above step at each 32 h (four times in total), and the removal rate of nitrogen oxide was obtained in the same manner as in the above step. As a result, it was found that excellent absorption and regeneration properties could be obtained by the above-described absorption and regeneration steps according to the present invention.

Further, as described in the above example, the present invention can be preferably applied to the removal of nitrogen oxide contained in air. However, in the present invention, the gas from which nitrogen oxide is removed is not particularly limited to air.

Section B: Basic Equipment Structure and Basic Removal Method

Figure 7:
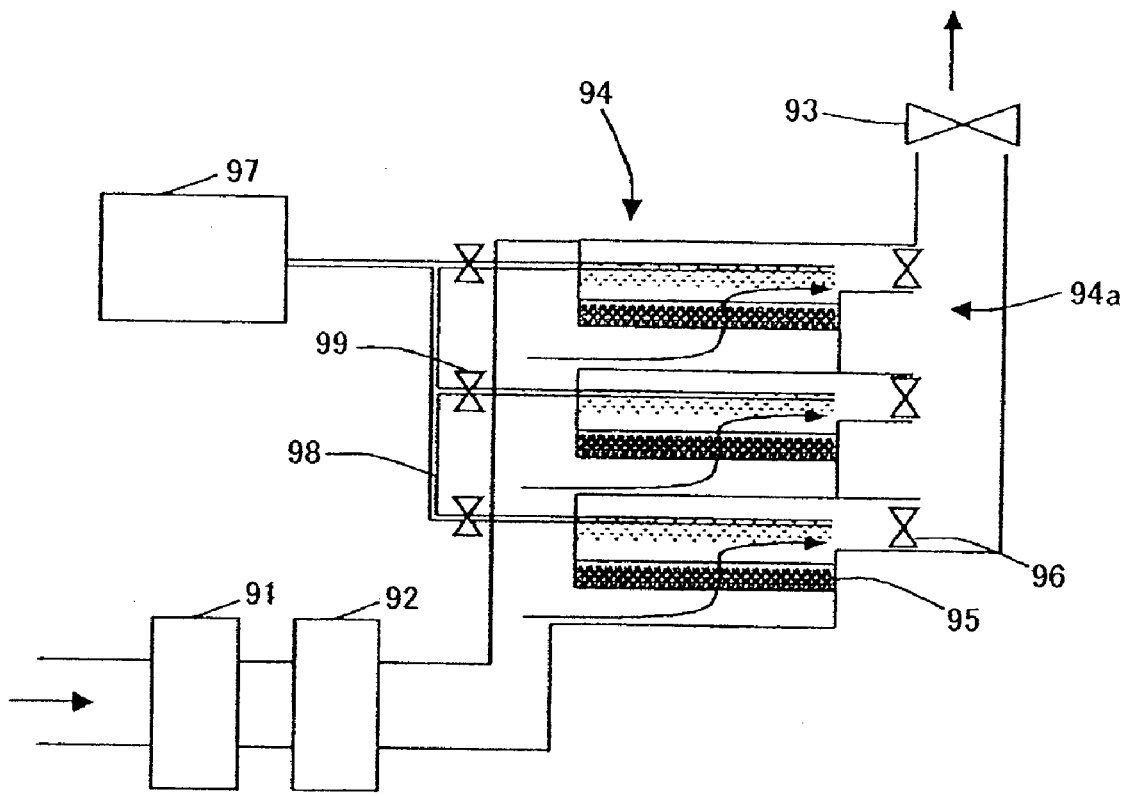
FIG. 7 A schematic illustration for explaining one example of the nitrogen oxide removal equipment according to the present invention.

FIG. 7 is a schematic drawing showing a structure, included in the basic structures according to the present invention, of a nitrogen oxide removal equipment with environmental stability of various properties of nitrogen oxide.

A nitrogen oxide removal equipment shown in FIG. 7 comprises: a humidifying means 91 for humidifying air taken into the removal equipment; a preprocessing means 92 for oxidizing nitrogen oxide contained in the air after passing through the humidifying means 91; a nitrogen oxide absorption means 94 for absorbing nitrogen oxide contained in the air after passing through the preprocessing means; and an air pressure feed fan 93 for collecting and taking air into the removal equipment, passing the air through the removal equipment, and discharging the air out of the removal equipment.

The nitrogen oxide absorption means 94 is provided with three absorption units 94a as shown in FIG. 7. The absorption units 94a remove nitrogen oxide contained in air by passing the air through solid absorbent layers 95 formed by filling the container with the solid absorbents, and each of the absorption units 94a is provided with a control fan 96 for controlling the speed of the air passing through the solid absorbent layers 95. Further, the three absorption units 94a are laminated in the direction intersecting the extension direction of the solid absorbent layers 95 (the horizontal direction in FIG. 7) and integrated.

In addition, although three absorption units 94a are laminated in the example of FIG. 7, the number of laminated absorption units is not particularly limited, and may be determined to any number equal to or more than two according to installation location conditions and the like.

Further, the nitrogen oxide removal equipment shown in FIG. 7 is provided with a regenerant supply means for supplying a regenerant to the nitrogen oxide absorption means 94 when the removal function of the solid absorbent layer 95 is deteriorated. The regenerant supply means comprises: a regenerant tank 97 for storing a regenerant, a regenerant supply line 98 for supplying a regenerant from the regenerant tank 97 to each absorption unit 94a, and a valve 99 for individually supplying a regenerant to each absorption unit 94a.

Furthermore, in the nitrogen oxide removal equipment shown in FIG. 7, a spray pipe connected to the regenerant supply line 98 for spraying a regenerant onto the solid absorbent layer 95 of each absorption unit 94a is provided on each solid absorption layer 95 so that the regenerant can be supplied evenly onto each solid absorption layer 95.

Further, the nitrogen oxide removal equipment shown in FIG. 7 is provided with a nitrogen oxide sensor (not shown) in an air discharge line for discharging the air after passing through the nitrogen oxide absorption means 94 as purified air. The nitrogen oxide sensor detects the nitrogen oxide removal function of the nitrogen oxide absorption means 94 and controls a concentration of nitrogen oxide contained in the purified air discharged from the removal equipment.

As for the nitrogen oxide removal equipment shown in FIG. 7, when the nitrogen oxide sensor detects nitrogen oxide of a predetermined concentration or higher, the nitrogen oxide removal function of the nitrogen oxide absorption means 94 is regenerated.

Any equipment may be used as the humidifying means so far as the same is capable of humidifying air. For example, an equipment for passing air through mesh-type filling-up layers containing water can be suitably used.

Further, the preprocessing means 92 oxidizes nitrogen oxide contained in air into nitrogen dioxide, dinitrogen trioxide, dinitrogen quadroxide or dinitrogen quitoxide. The shape of the preprocessing means 92 is not particularly limited, but preferably an equipment for carrying out oxidization by generating ozone, which is capable of effectively oxidizing nitrogen oxide of a low concentration, Furthermore, the nitrogen oxide removal equipment shown in FIG. 7 is equipped with a dust collection equipment for preventing a solid absorbent layer 91 or the like from clogging, if necessary.

Solid absorbents constituting the absorption unit 94a may be formed of crushed or formed particles having a diameter of few millimeters to few centimeters or particles having a honeycomb structure from the viewpoint of suppressing a pressure loss as aforementioned.

Further, in the nitrogen oxide removal equipment shown in FIG. 7, temperature control of air supplied to the nitrogen oxide absorption means 94 is not particularly necessary. However, in order to effectively absorb nitrogen oxide, a humidity is controlled to be not less than 60%, more preferably not less than 80% by the humidifying means 91.

Furthermore, in the nitrogen oxide removal equipment shown in FIG. 7, in order to effectively absorb nitrogen oxide, a spatial rate of air supplied to the absorption unit 94a is controlled to 1,000 to 200,000 $h^{-1}$, more preferably 3,000 to 100,000 $h^{-1}$ by using the pressure feed fan 93 and the control fan 96. A spatial rate of air supplied to the absorption unit 94a is determined in accordance with a concentration of nitrogen oxide to be removed from air, a type of solid absorbents, a size of the absorption unit 94a and the like.

A nitrogen oxide removal function of the nitrogen oxide absorption means 4 is gradually deteriorated as the solid absorbents reach absorption breakthrough by nitrogen oxide. However, in the nitrogen oxide removal equipment shown in FIG. 1, the nitrogen oxide absorption means 94 is regenerated by removing nitrogen oxide by using a regenerant from the solid absorbents that have reached the absorption breakthrough. The regenerant usable herein is not particularly limited, but an aqueous solvent containing a basic substance or a reducing substance is preferably used.

In addition, the inside of the regenerant tank 97 is preferably subjected to nitrogen substitution to prevent a reducing substance from deterioration by oxygen or the like. Furthermore, when the solid absorbents is regenerated, the inside of the absorption unit 94a is preferably subjected to nitrogen substitution in addition to the inside of the regenerant tank 97.

Next, a method for removing nitrogen oxide contained in air by using the above-described nitrogen oxide removal equipment will be described in detail.

Air from which nitrogen oxide is removed by the method described below is not particularly limited and specific examples thereof include air collected in a tunnel of a road, an underground parking area, or nearby an urban trunk road, which contains therein nitrogen oxide having a concentration of not more than few ppm causing a problem. Further, the humidity of air containing nitrogen oxide is preferably not less than 60%, more preferably not less than 80%.

In order to remove nitrogen oxide from the air containing nitrogen oxide, the air containing nitrogen oxide is first taken into the removal equipment by the powers of the pressure feed fan 93 and the control fan 96 as shown in FIG. 7 and then the air passes through the humidifying means 91, thereby controlling the humidity to not less than 60%, more preferably not less than 80%. Subsequently, the air after passing through the humidifying means 11 is supplied to the preprocessing means 92, and nitrogen oxide contained in the air is turned into nitrogen dioxide, dinitrogen trioxide, dinitrogen quadroxide or dinitrogen quitoxide and supplied to the nitrogen oxide absorption means 94. The air supplied to the nitrogen oxide absorption means 94 is supplied to all the absorption units 94a shown in FIG. 7 and a flowing rate of air passing through the solid absorbent layers 95 is controlled to a constant rate in all the absorption units 94a. Thereafter, when the air passes through the nitrogen oxide absorption means 94, nitrogen oxide contained in the air is removed by absorption and then the air is discharged as purified air after the detection of a concentration of nitrogen oxide contained therein by the nitrogen oxide sensor.

At this time, when nitrogen oxide of a predetermined concentration or higher is detected by the nitrogen oxide sensor, the nitrogen oxide absorption means 94 described below is regenerated.

The nitrogen oxide absorption means 94 is regenerated by a method wherein all valves 99 shown in FIG. 7 are opened and a regenerant is sprayed onto solid absorbent layers 91 of all absorption unit 94a from the regenerant tank 97 via the regenerant supply line 98 and the spray pipe to remove nitrogen oxide from the solid absorbents.

Thereafter, the removal of nitrogen oxide and the regeneration of the nitrogen oxide removal function are carried out repeatedly until the whole air containing nitrogen oxide is discharged as purified air.

Further, in the above-described equipment and the method for removing nitrogen oxide, since each absorption unit 94a is provided with the control fan 96 for controlling a flowing rate of air passing through the solid absorption layers 95, the flowing rate of the air passing through the solid absorbent layers 95 can be controlled to a constant rate in all absorption units 94a. Accordingly, at the time of removing nitrogen oxide, amounts of nitrogen oxide passing through the absorption units 94a can be made even and, at the same time, the removal function can be effectively prevented from deterioration due to uneven speed of air passing through the solid absorbents 95. Consequently, a high removal efficiency can be attained.

Furthermore, when the removal function of the solid absorbents 95 is deteriorated, nitrogen oxide absorbed by the solid absorbents 95 can be removed using a regenerant.

Further, there is provided the nitrogen oxide sensor for detecting the removal function, and the removal function is regenerated when the nitrogen oxide sensor detects nitrogen oxide of a predetermined concentration or higher, so that the nitrogen oxide removal function of a predetermined level or higher can be secured and the quality of purified air obtained after the removal of the nitrogen oxide can be improved.

In addition, in the equipment and the method for removing nitrogen oxide according to the present invention, the nitrogen oxide absorption means 94 may be regenerated when nitrogen oxide of a predetermined concentration or higher is detected by the nitrogen oxide sensor as described in the above example. However, the nitrogen oxide absorption means 94 may also be regenerated at predetermined intervals.

For example, when the method and the equipment for removing nitrogen oxide according to the present invention are continuously applied for a long period of time, the nitrogen oxide absorption equipment 94 may be regenerated at a cycle of once in one day, once in one week or the like taking into consideration the easiness of maintenance.

Further, nitrogen oxide may be removed using a regenerant by spraying the regenerant onto solid absorbents 95 as described in the above example or by immersing the solid absorbents into the regenerant within the absorption unit 94a or the like.

Further, as described in the above example, all absorption units 94a constituting the nitrogen oxide absorption means 94 may simultaneously carry out the removal of nitrogen oxide and the regeneration of the nitrogen oxide removal function, and the nitrogen oxide absorption means 94 may alternately carry out the removal of nitrogen oxide and the regeneration of the nitrogen oxide removal function. Alternatively, while some of the absorption units 94a constituting the nitrogen oxide absorption means 94 are removing nitrogen oxide, the remaining absorption units 94a may be regenerated. When the removal of nitrogen oxide and the regeneration of the removal function are thus carried out simultaneously in the nitrogen oxide absorption means 94, nitrogen oxide can be removed continuously and effectively. Moreover, according to the present invention, since three absorption units 94a are laminated in the direction intersecting the extension direction of the solid absorbent layers 95 and integrated, the removal of nitrogen oxide and the regeneration of the removal function so as to shorten a flow path for air in the removal equipment and a piping space through which the air passes can be made small as compared to the case where a plurality of removal equipments or a plurality of nitrogen oxide absorption equipments are used. Further, the removal equipments can be installed easily without a much labor.

Further, each absorption unit 94a is preferably provided with the control fan 96 as described in the above example, but the control fan 96 is not always necessary.

Furthermore, air containing nitrogen oxide is preferably supplied to the nitrogen oxide absorption means 94 after passing through the preprocessing means 92 as described in the above example. However, when there is no problem even though nitrogen oxide contained in air is removed at a low rate or when nitrogen oxide contained in air is formed of one or more gases selected from the group consisting of nitrogen dioxide, dinitrogen trioxide, dinitrogen quadroxide and dinitrogen quintoxide, the preprocessing means 92 may not be provided or the air containing nitrogen oxide may be supplied to the nitrogen oxide absorption means 94 without via the preprocessing means 92.

Furthermore, in the above example, the air containing nitrogen oxide is supplied to the preprocessing means 92 after passing through the humidifying means 91 and then supplied to the nitrogen oxide absorption means 94 after passing through the preprocessing means 92. However, the air may be supplied to the humidifying means 91 after passing through the preprocessing means 92 and then supplied to the nitrogen oxide absorption means 94 after passing through the humidifying means 91.

Further, air containing nitrogen oxide may be individually supplied to each absorption unit 94a via a piping capable of individually supplying air containing nitrogen oxide to each absorption unit 94a or the like.

Further, the present invention can be preferably applied to the removal of nitrogen oxide contained in air. However, gas from which nitrogen oxide is removed in the present invention is not particularly limited to air.

Further, as shown in FIG. 7, the absorption units according to the present invention may be absorption units provided with solid absorbent layers extending in the horizontal direction and laminated in the vertical direction and integrated. However, as shown in FIG. 8, the absorption units according to the present invention may also be absorption units provided with solid absorbent layers extending in the vertical direction and laminated in the horizontal direction and integrated.

Figure 8:
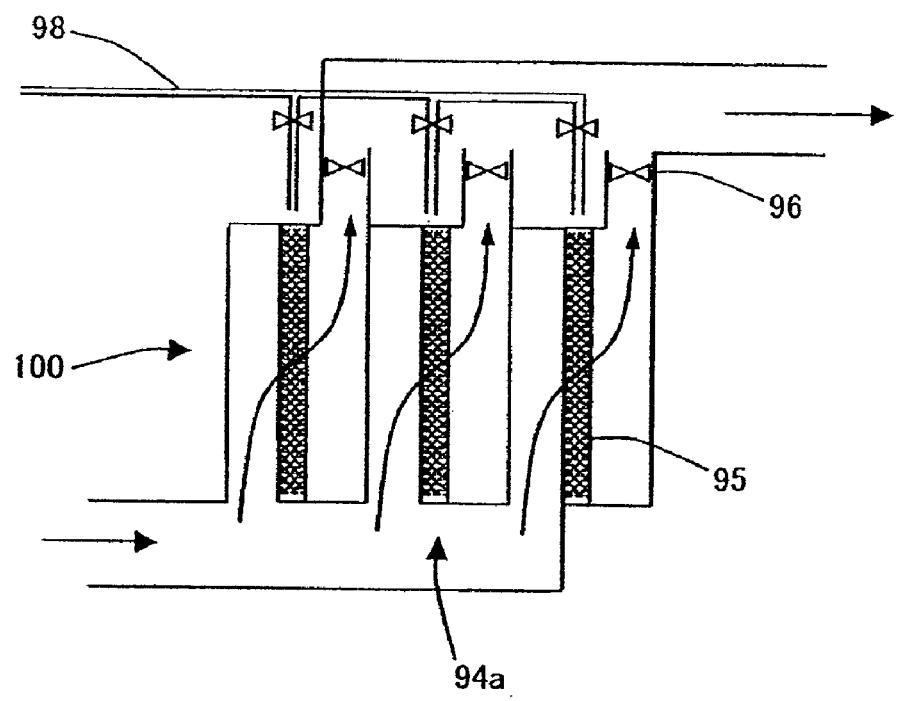
FIG. 8 A schematic illustration for explaining another example of the nitrogen oxide removal equipment according to the present invention.

FIG. 8 is a schematic drawing of assistance in explaining another example of the nitrogen oxide removal equipment according to the present invention. The nitrogen oxide removal equipment shown in FIG. 8 is the same as that shown in FIG. 7 except that the nitrogen oxide absorption means thereof are different. Therefore, portions other than the nitrogen oxide absorption equipment 100 and the periphery thereof are omitted in FIG. 8.

Since the absorption units 94a provided with the solid absorbent layers 95 extending in the vertical direction are laminated in the horizontal direction in the example of FIG. 8, a regenerant is supplied to a solid absorbents from the upper end surface of each solid absorbent layer 95 by a method of dripping the regenerant from the regenerant supply line 98.

In the nitrogen oxide removal equipment shown in FIG. 8, the solid absorbents also exhibit the sufficient removal function to obtain an excellent removal efficiency as in the nitrogen oxide removal equipment shown in FIG. 7. Furthermore, a pressure required to pass air through the removal equipment can be made low, thereby reducing the running cost.

Further, in the nitrogen oxide removal equipment shown in FIG. 8, since the absorption units 94a provided with the solid absorbents 95 extending in the vertical direction are laminated in the horizontal direction, the installation area for the nitrogen oxide absorption means 100 is the area of the end surface of the laminated absorption units 94a. Accordingly, the installation area for the nitrogen oxide removal equipment can be made small so that the installation space can be secured very easily. In this case, in consideration of the regeneration step, since the contact area in the gravity direction at the time of regeneration becomes small, there may be provided another means for carrying out the regeneration separately from the side direction or more effectively from the upper direction.

Section C: Example of Another Basic Structure

Figure 9:
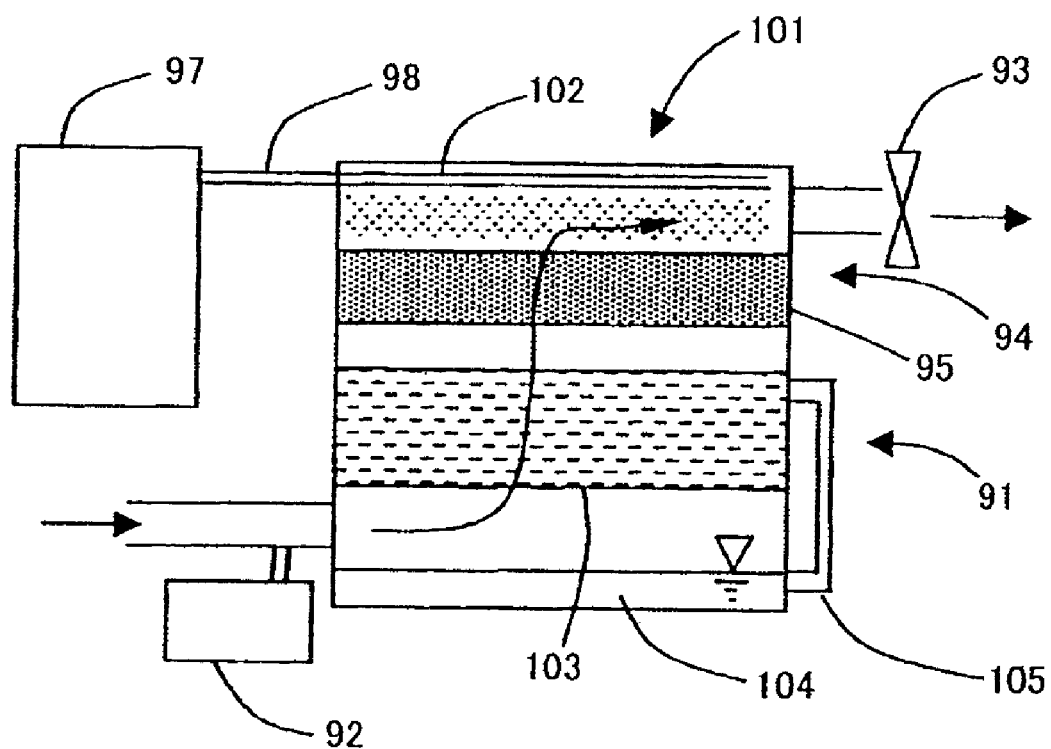
FIG. 9 A schematic illustration for explaining one example of the nitrogen oxide removal equipment according to the present invention.

FIG. 9 is a schematic drawing of assistance in explaining another basic structure of the nitrogen oxide removal equipment according to the present invention. The nitrogen oxide removal equipment shown in FIG. 9 comprises: a preprocessing means 92 for oxidizing nitrogen oxide contained in air to be supplied to a humidifying means 91; the humidifying means 91 for humidifying the air to be supplied to a nitrogen oxide absorption means 4; the nitrogen oxide absorption means 94 for absorbing nitrogen oxide contained in the air after passing through the humidifying means 91; and an air pressure feed fan 93 for collecting and taking air into the removal equipment, passing the air through the removal equipment, and discharging the air out of the removal equipment.

The nitrogen oxide absorption means 94 removes nitrogen oxide contained in air by passing the air through a solid absorbent layer 95 formed of solid absorbents. The humidifying means 91 is integrated with the nitrogen oxide absorption means 94 and overlapped with the solid absorption layers 95 in a plane as shown in FIG. 9.

Further, a material of a main body 101 formed by the integration of the nitrogen absorption means 94 with the humidifying means 91 is not particularly limited, but may be made of any material so far as air or water does not leak therefrom. However, in order to make possible of a long-term use, the main body 101 is preferably formed of a material having excellent water-fastness and weather-fastness. Specific examples of the material used to form a main body 9 includes soft steel, stainless steel, FRP and PCV, and the inner wall or the outer wall thereof is preferably lined to improve the durability.

Further, the nitrogen removal equipment shown in FIG. 9 is provided with a regenerant supply means for supplying a regenerant to the nitrogen oxide absorption means 94 in case that the removal function of the solid absorbent layer 95 is deteriorated. The regenerant supply means comprises: a regenerant tank 97 for storing a regenerant, a regenerant supply line 98 for supplying the regenerant from the regenerant tank 97 to the nitrogen oxide absorption means 94; and a spray pipe 102 connected to the regenerant supply line 98 to spray the regenerant onto the solid absorbent layers 95 so as to supply the regenerant evenly on the solid absorbent layers 95.

Further, the nitrogen oxide removal equipment shown in FIG. 9 is provided with a nitrogen oxide sensor (not shown) in an air discharge line for discharging the air after passing through the nitrogen oxide absorption means 94 as purified air. The nitrogen oxide sensor detects the nitrogen oxide removal function of the nitrogen oxide absorption means 94, and controls a concentration of nitrogen oxide of the purified air discharged from the removal equipment.

In the nitrogen oxide removal equipment shown in FIG. 9, the nitrogen oxide removal function of the nitrogen oxide absorption means 94 is regenerated when the nitrogen oxide sensor detects nitrogen oxide of a predetermined concentration or higher.

A humidifying means 91 usable herein comprises: filling-up layers 103 formed of mesh-type fillers; a water tank 104 provided in a layer below the filling-up layers 103 to store circulation water to be circulated in the humidifying means 91; and a water supply line 105 for supplying the circulation water from the water tank to the filling-up layers 103. In this humidifying means 91, water is supplied from the water tank to the filling-up layers 103 via the water supply line 105 and air passes through the humidifying means 91 to raise humidity of the air. In the nitrogen oxide removal equipment shown in FIG. 9, the humidity of the air supplied to the nitrogen oxide absorption means 94 after passing through the humidifying means 91 is preferably not less than 60%, more preferably not less than 80% so that nitrogen oxide is absorbed effectively.

Further, a preprocessing means 92 turns nitrogen oxide contained in air into nitrogen dioxide, dinitrogen trioxide, dinitrogen quadroxide or dinitrogen quintoxide. A shape of a preprocessing means 2 is not particularly limited, but preferably an oxidization equipment generating ozone to effectively oxidize nitrogen oxide of a low concentration. Further, the ozone generated by the preprocessing means 2 is preferably supplied to air before passing through the humidifying means 91.

Furthermore, the nitrogen oxide removal equipment shown in FIG. 9 may be provided with a dust collection function for preventing the solid absorbent layer 95 or the like from clogging, if necessary.

Solid absorbents constituting the solid absorbent layer 95 can be suitably selected from the solid absorbents having the aforementioned sizes, properties and materials, and the spatial rate thereof can be suitably selected within the range of 1,000 to 200,000 $h^{-1}$, more preferably within the range of 3,000 to 100,000 $h^{-1}$.

The nitrogen oxide removal function of the nitrogen oxide absorption means 94 is gradually deteriorated as the solid absorbents reach absorption breakthrough by nitrogen oxide. In the nitrogen oxide removal equipment shown in FIG. 9 however, the nitrogen oxide absorption means 94 is regenerated by removing nitrogen oxide by using a regenerant from the solid absorbents that have reached absorption breakthrough. Accordingly, the equipment and the method for the regeneration are not particularly limited. As the regenerant however, an aqueous solution containing the aforementioned basic or reducing substance is preferably used.

In order to remove nitrogen oxide from the air containing nitrogen oxide, the air containing nitrogen oxide is first taken into the removal equipment by the power of a pressure feed fan 93 as shown in FIG. 9, and nitrogen oxide contained in the air is turned into nitrogen dioxide, dinitrogen trioxide, dinitrogen quadroxide or dinitrogen quitoxide by ozone supplied from the preprocessing means 92 and then supplied to the humidifying means 91. The humidity of the air supplied to the humidifying means 91 is controlled to not less than 60%, more preferably not less than 80% and then supplied to the nitrogen oxide absorption means 94. Nitrogen oxide contained in the air supplied to the nitrogen oxide absorption means 94 is absorbed and removed by passing through the solid absorbent layers 95 and discharged as purified air after the detection of a concentration of nitrogen oxide by the nitrogen oxide sensor.

At this time, when nitrogen oxide of a predetermined concentration or higher is detected by the nitrogen oxide sensor, the nitrogen oxide absorption means 94 described below is regenerated.

The nitrogen oxide absorption means 94 is regenerated by a method of spraying the regenerant onto the solid absorbent layers 95 from the regenerant tank 97 via the regenerant supply line 98 and the spray pipe to remove nitrogen oxide from the solid absorbents. A valve 99 is disposed between the regenerant supply line 88 and the spray pipe. When the regeneration step is requested, the valve 99 is opened to supply the regenerant. The regenerant used at the time of the regeneration, i.e., the regenerant after passing through the solid absorbent layers 95 passes through the filling-up layers 103 disposed in layers below the solid absorbent layers 95 and is supplied to the water tank 104 to be used as recirculation water.

After the regeneration of the nitrogen oxide absorption means 94, the removal of nitrogen oxide and the regeneration of the nitrogen oxide removal function are carried out repeatedly until whole air containing nitrogen oxide is discharged as purified air.

According to the nitrogen oxide removal equipment shown in FIG. 9, the humidifying means 91 is integrated with the nitrogen oxide absorption means 94 so as to overlap with the solid absorbent layers 95 in a plane. Accordingly, the removal equipment can be installed easily as compared to the case where the humidifying means is provided separately from the removal equipment. Further, a space for installing the removal equipment can be made small. Furthermore, since the removal equipment and the humidifying equipment need not to be interconnected with a piping duct for interconnection, a pressure required to pass air through the removal equipment is not lost in the piping duct for interconnection. As a result, the pressure required to pass air through the removal equipment can be made low, thereby reducing the running cost can. Further, the piping duct for interconnection can be installed without a much labor. Furthermore, the humidifying means needs not to be provided separately from the removal equipment so that the removal equipment can be installed easily as compared to the case where the humidifying means is provided separately from the removal equipment.

Furthermore, since air after passing through the humidifying means 91 is supplied to the nitrogen oxide absorption means 94, a hydration reaction is caused on the surface of the solid absorbents constituting the solid absorbent layers 95 regardless of humidity of air to be taken into the removal equipment, and nitrogen oxide is turned into nitrous acid or nitric acid. As a result, an amount of nitrogen oxide absorbed by the solid absorbent layers 95 increases and the nitrogen oxide can be easily absorbed by the solid absorbent layers 95, thereby efficiently removing nitrogen oxide contained in air.

Further, when the removal function of the solid absorption layer 95 is deteriorated, nitrogen oxide absorbed by the solid absorption layer 95 can be removed by the regenerant.

Furthermore, there is provided the water tank 104 for storing circulation water which circulates in the humidifying means 91 to supply the regenerant onto the solid absorbent layers 95, thereby supplying the regenerant after passing through the solid absorbent layers 95 is supplied to the water tank 104, so that the regenerant used for the regeneration of the removal function can be reused as circulation water.

Furthermore, there is provided the nitrogen oxide sensor, and the removal function is regenerated when the nitrogen oxide sensor detects nitrogen oxide of a predetermined concentration or higher, so that the nitrogen oxide removal function of a predetermined level or higher can be secured and the quality of purified air obtained after the removal of nitrogen oxide can be improved.

Further, the nitrogen oxide removal means is provided with the preprocessing means 92 for turning nitrogen oxide contained in air supplied to the humidifying means 91 into nitrogen dioxide, dinitrogen trioxide, dinitrogen quadroxide or dinitrogen quitoxide, so that nitrogen oxide contained in air can be removed effectively.

Further, since the preprocessing means 92 carries out oxidization by using ozone, nitrogen oxide contained in air to be supplied to the humidifying means 91 can be oxidized effectively. Moreover, even when the air supplied to the humidifying means 91 contains excessive ozone that has not been used for the oxidization reaction in the preprocessing means 92, the excessive ozone is decomposed in the humidifying means 91, so that the solid absorbents can be prevented from deterioration due to the excessive ozone, Further, since ozone generated in the preprocessing means 92 is supplied into air before passing through the humidifying means 91, a space for installing the removal equipment can be made small as compared to the case where a means for oxidizing nitrogen oxide contained in air by passing the air through the preprocessing equipment as a preprocessing means. Furthermore, a pressure required to pass air through the removal equipment can be made low as compared to the case where air passes through the preprocessing equipment constituting the preprocessing means.

Further, in the nitrogen oxide removal equipment according to the present invention shown in FIG. 9, the humidifying means 91 and the solid absorbent layers 95 are preferably completely overlapped with each other in a plane as described in the above example. However, the humidifying means 91 may be integrated with the nitrogen oxide absorption means 94 so as to be overlapped with at least a part of the solid absorbent layers 95, and the sizes of the area to be overlapped with each other are not particularly limited, but may be determined according to the installation spaces or the like. Further, the plane area of the filling-up layer 103 constituting the humidifying means 91 may be the same as that of the solid absorbent layer 95 as described in the above example or different. These areas are not particularly limited, but may be determined according to the installation spaces or the like.

Further, the removal of nitrogen oxide by using the regenerant may be carried out by a method of spraying the regenerant onto the solid absorbent layers 95 or by a method of immersing the solid absorbents into the regenerant within the main body 101.

Further, the humidifying means 91 described in the above example or another humidifying means may be used as the humidifying means 91. The humidifying means 91 usable herein is not particularly limited and, for example, an equipment for raising humidity by spraying water into air or the like.

Figure 10:
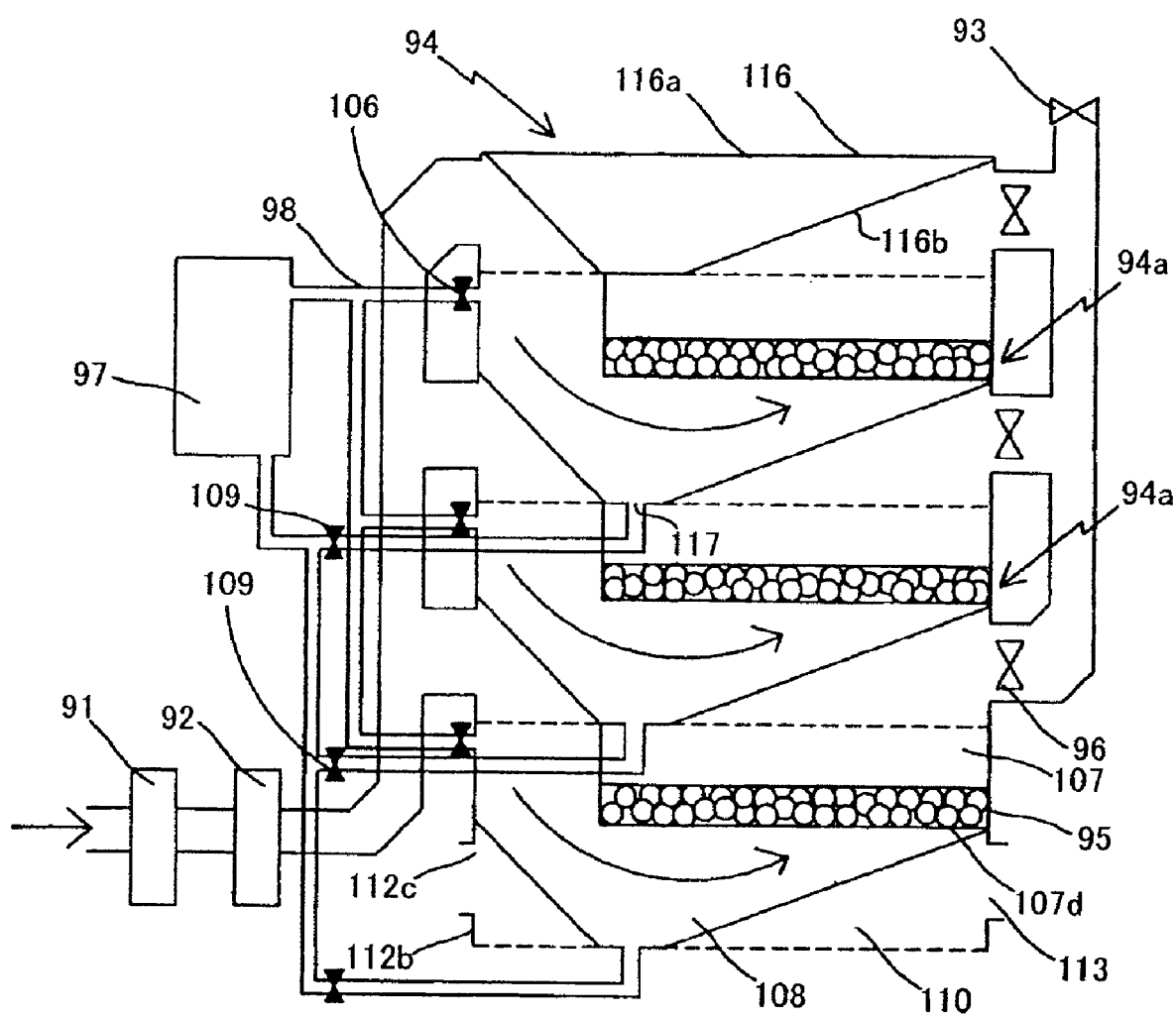
FIG. 10 A schematic illustration for explaining one example of the nitrogen oxide removal equipment according to the present invention.
Figure 11:
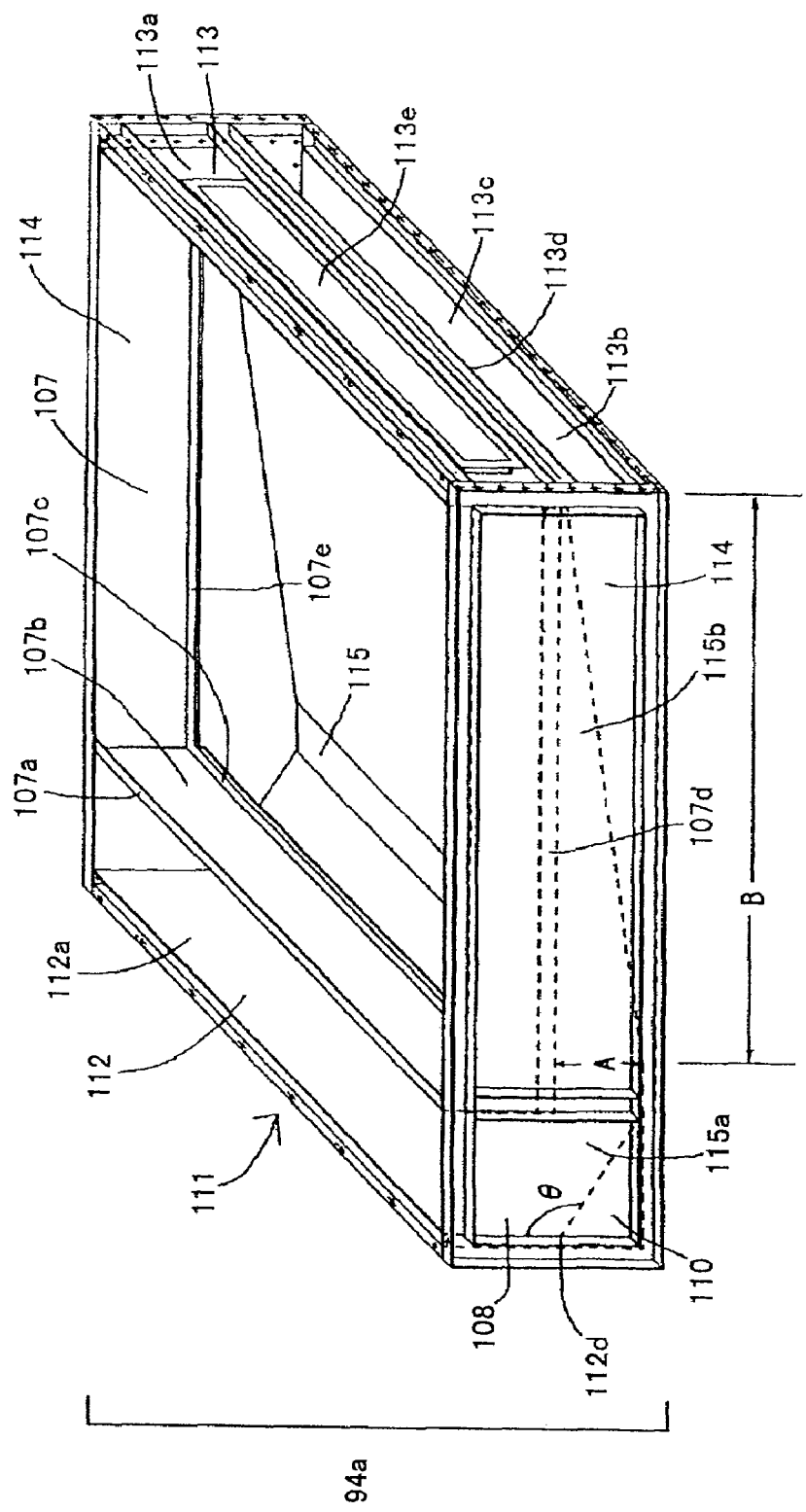
FIG. 11 A schematic illustration for explaining a structure of an absorption unit.

Section D: Preferred Embodiments of Equipment and Method for Removing Nitrogen Oxide According to the Present Invention Preferred embodiments of the equipment and the method for removing nitrogen oxide according to the present invention will be described in detail with reference to the accompanying drawings. FIG. 10 is a schematic drawing of a nitrogen oxide removal equipment according to the present invention. FIG. 11 is a schematic drawing of assistance in explaining a structure of an absorption unit. In addition, a bottom panel of a storage part and solid absorbent layers are not shown in FIG. 11 to make it easy to see the drawing.

The nitrogen oxide removal equipment shown in FIG. 10 comprises: a humidifying means 91 for humidifying air taken into the removal equipment; a preprocessing means 92 for oxidizing nitrogen oxide contained in the air after passing through the humidifying means 91; a nitrogen oxide absorption means 94 for absorbing nitrogen oxide contained in the air after passing through the preprocessing means; and an air pressure feed fan 93 for collecting and taking air into the removal equipment, passing the air through the removal equipment, and discharging the air out of the removal equipment.

In addition, the installation location of the pressure feed fan 93 is not particularly limited, but can be a location before the humidifying means 91 or between the humidifying means 91 and the preprocessing means 92 so far as air can pass through the absorption unit 94a.

The nitrogen oxide absorption means 94 is provided with three absorption units 94a as shown in FIG. 10. The absorption units 94a remove nitrogen oxide contained in air by passing the air through the solid absorbent layers 95 composed of solid absorbents. Each absorption unit 94a is provided with a control fan 96 for controlling flowing rates of air passing through the solid absorptive layers 95. Further, the three absorption units 94a are laminated and integrated in the vertical direction. In FIG. 10, the upper end and the lower end of each absorption unit 94a are indicated by dotted lines.

In addition, although three absorption units 94a are laminated in the example of FIG. 10, the number of laminated absorption units is not particularly limited, and may be determined to any number equal to or more than two according to installation location conditions and the like.

Further, the nitrogen oxide removal equipment shown in FIG. 10 is provided with a regenerant supply means for supplying a regenerant to the nitrogen oxide absorption means 94 in case that the removal function of the solid absorbent layer 95 is deteriorated. The regenerant supply means comprises: a regenerant tank 97 for storing the regenerant; a regenerant supply line 98 for supplying the regenerant from the regenerant tank 97 to each absorption unit 94a and, at the same time, returning the used regenerant from each absorption unit 94a to the regenerant tank 97; a supply valve 106 for individually supplying the regenerant to each absorption unit 94a; and an exhaust valve 109 which is closed when the regenerant supplied to the absorption unit 94a is accumulated in a gas rectification part 108.

Furthermore, in the nitrogen oxide removal equipment shown in FIG. 10, an absorbent storage part 107 and a gas rectification part 108 have water-tightness so that the regenerant supplied from the regenerant supply line 98 at the time of regeneration can be accumulated in the absorbent storage part 107 and the gas rectification part 108 and the solid absorbent layer 95 can be immersed in the regenerant.

Further, the nitrogen oxide removal equipment shown in FIG. 10 is provided with a nitrogen oxide sensor (not shown) in an air discharge line for discharging air after passing through the nitrogen oxide absorption means 94 as purified air. The nitrogen oxide sensor detects a nitrogen oxide removal function of the nitrogen oxide absorption means 94 and controls a concentration of nitrogen oxide contained in the purified air discharged from the removal equipment.

In the nitrogen oxide removal equipment shown in FIG. 10, the nitrogen oxide removal function of the nitrogen oxide absorption means 94 is regenerated when the nitrogen oxide sensor detects nitrogen oxide of a predetermined concentration or higher.

Any equipment may be used as the humidifying means 91 so far as the same is capable of humidifying air. For example, an equipment for passing air through mesh-type filling-up layers containing water may be suitably used.

Further, the preprocessing means 92 oxidizes nitrogen oxide contained in air into nitrogen dioxide, dinitrogen trioxide, dinitrogen quadroxide or dinitrogen quintoxide. The shape of the preprocessing means 92 is not particularly limited, but is preferably an equipment for carrying out oxidization by ozone generation capable of effectively oxidizing nitrogen oxide of a low concentration.

Furthermore, the nitrogen oxide removal equipment shown in FIG. 10 may be provided with a dust collection function for preventing the solid absorbent layers 95 from clogging, it necessary. For example, the preprocessing equipment 92 may be used as an electric dust collector for collecting dust at the time of oxidization of nitrogen oxide.

Further, the thickness of the solid absorbent layer 95 shown in FIG. 10 is not particularly limited, but is preferably in the range of 10 to 50 cm, more preferably in the range of 15 to 30 cm. If the thickness of the solid absorbent layer 95 exceeds 50 cm, it is unfavorable because a pressure loss increases. Further, if the thickness of the solid absorbent layer 95 is less than 10 cm, it is also unfavorable because there is the possibility that a sufficient removal function cannot be obtained.

As shown in FIGS. 10 and 11, the absorption unit 94a comprises, the absorbent storage part 107 provided therein with the solid absorbent layers 95; the rectification part 108 for rectifying air passing through the solid absorbent layers 95; and a rectification part 110 for a lower-stage unit for, when the absorption unit 94a is laminated, rectifying air passing through the solid absorbent layers 95 another absorption unit 94a disposed below a unit body 111.

As shown in FIGS. 10 and 11, the unit body 111 is disposed opposite to an intake side surface 112 having an upper portion of an intake side 112a and a lower portion of an intake side 112b provided with an air intake 112c to a rectification part 110 for a lower-stage unit as shown in FIG. 11. The unit body 111 has a plane-view rectangular low-profile shape provided with: an outlet side surface 113 having an upper portion of an outlet side 113a and a lower portion of an outlet side 113b provided with an air outlet port 113c from the rectification part for a lower-stage unit; and two side surfaces 114 are provided in the direction intersecting an intake side surface 112 and an outlet side surface 113.

Further, as shown in FIGS. 10 and 11, the air intake 112*c* is provided over the full width of the input side surface 112 and the air outlet port 113*c* is provided over the full width of the outlet side surface 113 to flow air evenly through the absorption units 94*a*.

The upper portion of the outlet side 113*a* of the outlet side surface 113 is provided with an opening part 113*e* capable of being opened and closed so that solid absorbents can be taken into and out from the outlet side surface 113 even in the state where the absorption units 94*a* are laminated. Accordingly, the solid absorbent layers 95 can be formed before or after the lamination of the absorption units 94*a*. Further, solid absorbents can be replaced after the formation of the solid absorbent layers 95, if necessary.

A boundary wall of a storage part 107*b* is disposed between the input side surface 112 and the outlet side surface 113, and a bottom panel of a storage part 107*d* is disposed horizontally from a lower end 107*c* of the boundary wall of the storage part 107*b* to the upper portion of the outlet side 113*a* so as to form an absorbent storage part 107 surrounded by the boundary wall of the storage part 107*b*, the bottom panel of the storage part 107*d* and the upper portion of the outlet side 113*a*.

Holes having a diameter smaller than the particle diameter of the solid absorbents are made on the bottom panel of the storage part 107*d*. A mesh-type material made of a metal is used as the bottom panel of the storage part 107*b*. Further, as shown in FIG. 11, the bottom panel of the storage part 107*d* is supported by placing the edge of the bottom panel of the storage part 107*d* on a support members 107*e* projecting toward the inside of the absorbent storage part 107 along the inner wall of the same.

Further, the numeral 115 in FIG. 11 represents a bottom of a rectification part. As shown in FIG. 11, the bottom of the rectification part 115 is located below an intake side boundary 112, i.e., a boundary between an upper portion of an intake side 112*a* and a lower portion of an intake side 112*d*, and disposed horizontally below an outlet side boundary 113*d*.

Furthermore, as shown in FIG. 11, the unit body 111 comprises: a bottom panel of an intake side 115*a* extending from the boundary of the intake side 112*d* to the bottom of the rectification part 115; and a bottom panel of an outlet side 115*b* extending from the boundary of the outlet side 113*d* to the bottom of the rectification part 115.

The gas rectification part 108 is separated from the rectification part 110 for a lower unit by the bottom of the rectification part 115, the bottom panel of the intake side 115*a* and the bottom panel of the outlet side 115*b*, so that air passing through the unit body 111 is separated from air passing through another absorption unit 94*a* disposed below the unit body 111 as shown in FIG. 10.

Further, as shown in FIG. 11, the bottom of the rectification part 115 is a plane in parallel with the bottom panel of the storage part 107*d*, and provided with an exhaust port for exhausting, at the time of regeneration, the regenerant accumulated in the absorbent storage part 107 and the rectification part 108. As shown in FIG. 10, the exhaust port 117 is connected to the regenerant tank 98 with the regenerant supply line 98, so that the regenerant used at the time of regeneration is returned to the regenerant tank 97. Further, the exhaustion of the regenerant from the exhaust port 117 by the exhaust valve 109 provided individually in each absorption unit 94*a* can be carried out individually for each absorption unit 94*a*.

Furthermore, as shown in FIG. 11, the bottom of the rectification part 115 is disposed so as to overlap with the boundary wall of the storage part 107*b* in a plane Therefore, when the absorption unit 94*a* is laminated, the bottom of the rectification part 115 is overlapped with the upper end 107*a* of the boundary wall of the storage part 107*b* of another absorption unit 94*a* disposed below the unit body 111.

Further, an angle θ between the bottom panel of the intake side 115*a* and the upper portion of the intake side 112*a* is preferably 90 to 180 degrees, more preferably 120 to 150 degrees. If the angle θ between the bottom panel of the intake side 115*a* and the upper portion of the intake side 112*a* is less than 90 degrees or more than 180 degrees, there is the possibility that a sufficient rectification effect of air passing through the gas rectification part 108 or the rectification part 110 for a lower-stage unit cannot be obtained.

Further, the ratio of A:B is preferably from 1:1, to 1:10, more preferably from 1:2 to 1:5 where A represents a distance from the boundary between the bottom of the intake side 115 and the bottom panel of the outlet side 115*b* to the bottom panel of the storage part 107*d*, and B represents a distance from the boundary between the bottom of the rectification part 115 and the bottom panel of the outlet side 115*b* to the outlet side surface 113. If the above ratio A:B is less than 1:1 or more than 1:10, there is the possibility that a sufficient rectification effect for air passing through the rectification part 18 cannot be obtained.

Further, as shown in FIG. 10, the nitrogen oxide removal equipment according to the present invention is provided with a lid 116 above the absorption unit 94*a* constituting the uppermost portion of the nitrogen oxide absorption means 94. As shown in FIG. 10, the lid 116 has a lower portion 116*b* of the same shape as the lower portion of the bottom panel of the storage part 107*d* of the absorption unit 94*a* below a top panel 116*a*, so that a flow path for air passing through the absorption unit 94*a* constituting the uppermost portion has the same shape as that of a flow path for air flowing through another absorption unit 94*a*.

Further, the unit body 111 and the lid 116 can be formed of any material, for example, a single material or a composite material such as soft steel, stainless steel, FRP or PCV, or the like, and the material is not substantially limited in the present invention.

Further, a humidity condition, an absorbents, a regenerant, a flowing rate and the like of the nitrogen oxide removal equipment shown in FIG. 10 can be suitably selected from the aforementioned materials and conditions and used.

In order to remove nitrogen oxide from the air containing nitrogen oxide, the air containing nitrogen oxide is first taken into the removal equipment by the powers of the pressure feed fan 93 and the control fan 96 as shown in FIG. 10, and the air then passes through the humidifying means 91 to control the humidity thereof to not less than 60%, more preferably not less than 80%. Subsequently, the air after passing through the humidifying means 91 is supplied to the preprocessing means 92 and the nitrogen oxide contained in the air is turned into nitrogen dioxide, dinitrogen trioxide, dinitrogen quadroxide or dinitrogen quitoxide, and the air is then supplied to the nitrogen oxide absorption means 94. The air supplied to the nitrogen oxide absorption means 94 is supplied to all absorption units 94*a* shown in FIG. 10, and is controlled so that the air passes through all absorption units 94*a* at a constant flowing rate in the solid absorbent layers 95. Thereafter, when the air passes through the nitrogen oxide absorption means 94, the nitrogen oxide contained therein is absorbed and removed.

At this time, the air passing through the solid absorbent layers 95 flows in the removal equipment shown in FIG. 10. That is, as shown in FIG. 11, the bottom panel of the intake side 115*a* inclines downward from the intake side boundary 107*d* to the bottom of the rectification part 115, and the bottom panel of the outlet side 115*b* inclines upward from the bottom of the rectification part 115 to the boundary of the outlet side 113*d*. Further, in the lower two absorption units 94*a* of the absorption units 94*a* shown in FIG. 10, the whole space formed by the bottom of the rectification part 115 constituting the upper and lower adjacent absorption units 94*a*, the bottom panel of the outlet side 115*a*, and the bottom panel of the outlet side 115*b* serves as a flow path for the air passing through the absorption units 94*a*. Further, in the uppermost absorption unit 94*a*, the whole space formed by the bottom of the rectification part 115, the bottom panel of the intake side 115*a*, the bottom panel of the outlet side 115*b*, and the lid 116 serves as a flow path for the air that passes through the absorption units 94*a*.

Accordingly, air to pass through each absorption unit 94*a* is supplied from the air intake port 112*c*, flown obliquely downward by the bottom panel of the intake side 115*a* from the intake side boundary 112*d* to the bottom of the rectification part 115 as indicated by the arrow in FIG. 10, flown obliquely upward by the bottom panel of the outlet side 115*b* from the bottom of the rectification part 115 to the boundary of the outlet side 113*d*, and discharged from the air outlet port 113*c* after passing through the solid absorbent layers 95.

A concentration of nitrogen oxide contained in the air thus passed trough the nitrogen oxide absorption means 94 is detected by the nitrogen oxide sensor and then the air is discharged as purified air. At this time, when the nitrogen oxide sensor detects nitrogen oxide of a predetermined concentration or higher, the nitrogen oxide absorption means 94 described below is regenerated.

The nitrogen oxide absorption means 94 is regenerated by a method wherein all supply valves 106 shown in FIG. 10 are opened, all exhaust valves 109 are closed, regenerant is supplied from the regenerant tank 97 via the regenerant supply line 98, and the regenerant is accumulated in the absorbent storage parts 107 and the gas rectification parts 108 of all absorption units 94*a* to remove nitrogen oxide from the solid absorbents, and thereafter, all supply valves 106 are closed, all exhaust valves 109 are opened, and the used regenerant is exhausted from the exhaust port 117 and returned to the regenerant tank 97 by the regenerant supply line.

Thereafter, the removal of nitrogen oxide and the regeneration of the removal function are repeatedly carried out until the whole air containing nitrogen oxide is discharged as purified air.

According to the equipment and the method for removing nitrogen oxide shown in FIGS. 10 and 11, since three low-profile absorption units 94*a* are laminated and integrated, the installation area for the solid absorbent layer 95 can be reduced to one third as compared to the case where three absorption units 94*a* are installed in line in the extension direction of the solid absorbent layers 95, so that the installation space for the removal equipment can be secured easily. Moreover, since the area on the solid absorbent layers 95 is equal to that in the case where three absorption units 94*a* are installed in a line in the extension direction of the solid absorbent layers 95, the nitrogen oxide removal function is not deteriorated and the solid absorbents can sufficiently exhibit the removal function thereof, so that an excellent removal effect can be attained as compared to the case where three absorption units 94*a* are installed in line in the extension direction of the solid absorbent layers 95. Furthermore, since the area of each solid absorbent layer 95 can be reduced to one third, a pressure for passing air through the removal equipment can be made low, thereby reducing the running cost, air containing nitrogen oxide can be highly efficiently supplied to the solid absorbent layers 95. Further, a high absorption efficiency can be attained and a contact area in the gravity direction for the regenerant can be increased, thereby improving the regeneration efficiency.

Furthermore, since the unit body is provided with the bottom of the rectification part 115, the bottom panel of the intake side 115*a* and the bottom panel of the outlet side 115*b*, air passing through each absorption unit 94*a* is flown obliquely downward by the bottom panel of the intake side 115*a* from the boundary of the intake side 112*d* to the bottom of the rectification part 115, flown obliquely upward by the bottom panel of the outlet side 115*b* from the bottom of the rectification part 115 to the boundary of the outlet side 113*d*, and the air then passes through the solid absorbent layers 95.

As a result, the flow of gas passing through the absorption unit is hardly disturbed and the gas passing through the solid absorbent layers 95 flows smoothly as compared to the case where the bottom of the rectification part 115, the bottom panel of the intake side 115*a* and the bottom of the outlet side 115*b* are all disposed in parallel with the solid absorbent layers 95. Further, since the flowing rate is made even, the pressure required to pass the gas through the removal equipment can be made very low. Furthermore, in the present invention, a wind velocity adjustment damper may be used instead of the control fan 96.

Further, since the rectification part 110 for a lower-stage unit is separated from the gas rectification part 108 by the bottom of the rectification part 115, the bottom panel of the intake side 115*a* and the bottom panel of the outlet side 115*b*, the regenerant is not supplied at the time of regeneration. Accordingly, an amount of the regenerant used can be reduced as compared to the case where the bottom of the rectification part 115, the bottom panel of the intake side 115*a* and the bottom panel of the outlet side 115*b* are all disposed in parallel with the solid absorbent layers 95.

In addition, in the equipment and the method for removing nitrogen oxide according to the present invention, as described in the above example, the lid 116, having the same shape portion below the top panel 116*a* as the shape of the portion below the bottom panel of the storage part 107*d* of the absorption unit 94*a*, is desirably disposed on the absorption unit 94*a* constituting the uppermost portion of the nitrogen oxide absorption means 94, so that the flow path for gas passing through the absorption unit 94*a* constituting the uppermost portion has the same shape as that of the flow path for gas passing through another absorption unit 94*a*. However, a lid consisting of only the top panel 116*a* or a lid having a different shape may also be provided on the absorption unit 94*a* constituting the uppermost portion of the nitrogen oxide absorption means 94.

Further, as described in the above example, all absorption units 94*a* constituting the nitrogen oxide absorption means 94 may simultaneously carrying out the removal of nitrogen oxide and the regeneration of the nitrogen oxide removal function. On the other hand, according to an embodiment of the present invention, since a plurality of absorption units 94*a* are used, while some of the plurality of absorption units 94*a* constituting the nitrogen oxide absorption means 94 are removing nitrogen oxide, the remaining absorption units 94*a* may be regenerated. When the removal of nitrogen oxide and the regeneration of the removal function are thus simultaneously carried out in the nitrogen oxide absorption means 94, nitrogen oxide can be removed continuously and effectively.

Furthermore, in the above example, the air containing nitrogen oxide is supplied to the preprocessing means 92 after passing through the humidifying means 91 and then supplied to the nitrogen oxide absorption means 94 after passing through the preprocessing means 92. However, the air may also be supplied to the humidifying means 91 and then supplied to the nitrogen oxide absorption means 94 after passing through the humidifying means 91.

Further, air containing nitrogen oxide may be supplied individually to each absorption unit 94a via the pipe capable of individually supplying air containing nitrogen oxide to each absorption unit 94a or the like.

Figure 12:
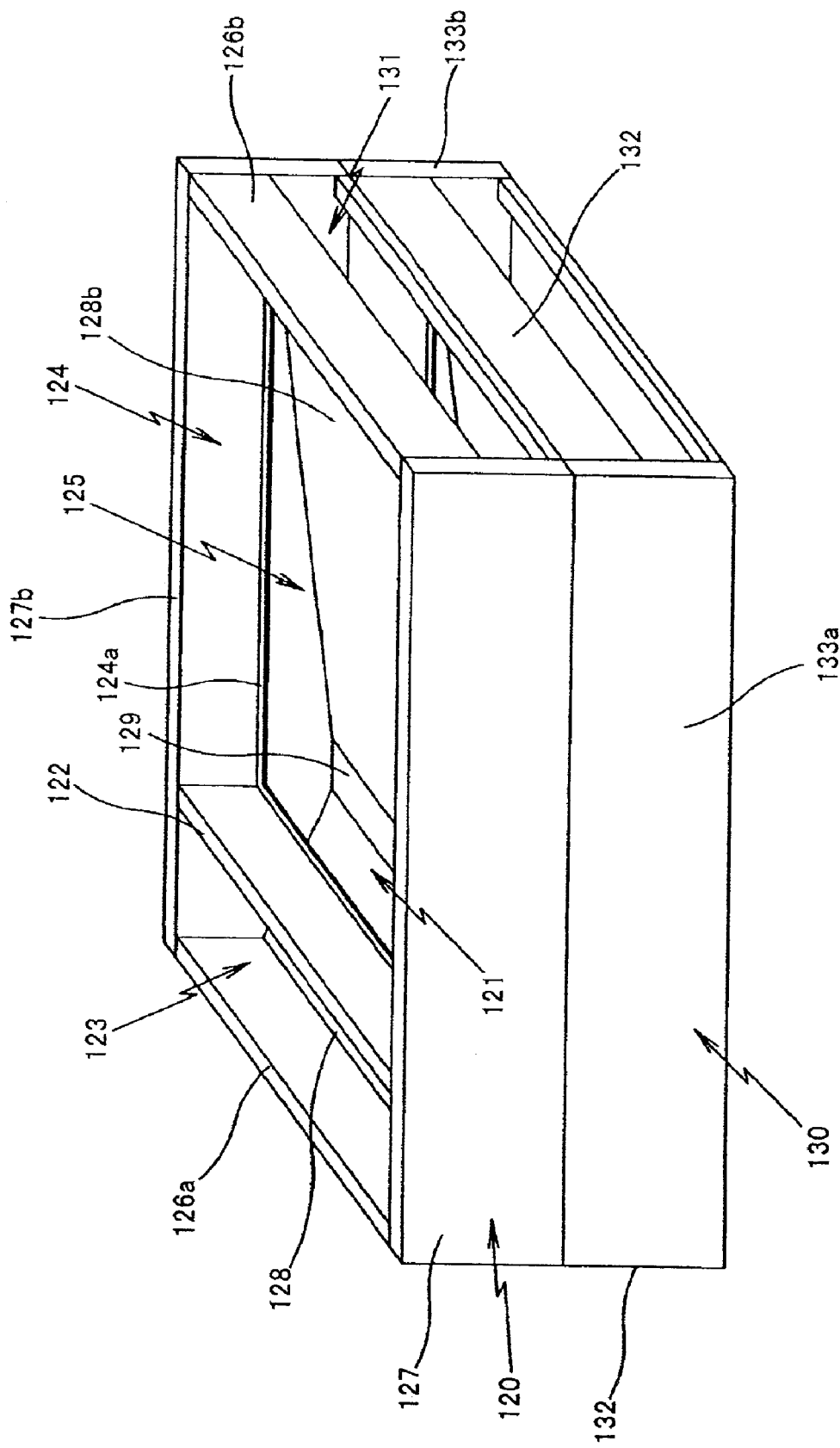
FIG. 12 A view showing a second embodiment of the absorption unit according to the present invention.

FIG. 12 is a view showing an example of a second embodiment of an absorption unit filled with particles by using a filling-up equipment according to the present invention. The absorption unit shown in FIG. 12 per se is not provided with an opening or a nozzle thereon. Two openings however can be formed by putting the absorption unit on top of another absorption unit of the same type. FIG. 12 shows piled-up two absorption units 120 and 130. The absorption units 120 and 130 shown in FIG. 12 have open tops and two inclinations formed on bottom portions 121 thereof so as to form two openings 131 by the two inclinations on the bottom portion 121 of the upper absorption unit 120 and the lower absorption unit 130. FIG. 12 shows one opening 131 only. The absorption units 120 and 130 each can be used, for example, as an absorption unit. In this case, a partition panel 122 is provided in the absorption unit, and a gas flowing-in part 123 communicating with one opening and an absorbent filling-up part 124 communicating with another opening are formed by the partition panel 122, and a gas flow path part 125 communicating with the gas flowing-in part 123 and the absorbent filling-up part 124 is formed on the bottom portion 121. In addition, the above-described one opening and the other opening are formed on the gas flowing-in part 123 and the absorbent filling-up part 124 by further putting another absorption unit of the same type on top of the upper absorption unit 120.

The absorption unit 120 shown in FIG. 12 flows gas from one of the formed openings and exhaust the gas from the other opening via the gas flowing-in part 123, the gas flow path part 125 and the absorbent filling-up part 124. For example, the absorbent filling-up part 124 is provided with a support part 124a and a porous panel (not shown) supported by the support parts 124a and filled with an absorbents on the porous panel. The absorption units 120 and 130 shown in FIG. 12 are used in two stages, but more absorption units of the same type may be piled up in use.

The absorption unit 120 shown in FIG. 12 will now be described in detail. The absorption unit 120 is constructed by two pairs of opposite side panels 126a and 126b, 127a and 127b, a partition panel 122, two inclined panels 128a and 128b forming predetermined inclinations, the above-described support part 124a, and the above-described porous panel. Two opposite side panels of each of the two pairs 126a and 126b, 127a and 127b have the same size. The vertical length of one pair of side panels 126a and 126b is smaller than the vertical length of the other pair of side panels 127a and 127b. When the upper ends of these side panels 126a, 126b, 127a and 127b are aligned, the two openings 131 can be formed by piling up the lower absorption unit 130. The partition panel 122 is disposed in parallel with the pair of side panels 126a and 126b having the reduced vertical length and between the pair of side panels 126a and 126b with spaces. When the upper ends of the two pairs of side panels 126a, 126b, 127a and 127b are aligned with the upper end of the partition panel 122 and an absorption unit of the same type is disposed thereon, the bottom portion of the absorption unit is located adjacent to the upper end of the partition panel 122. The two inclined panels 128a and 128b are joined so as to communicate with the pair of side panels 126a and 126b having the reduced vertical length to form a flow path below the partition panel 122. These two inclined panels 128a and 18b are interconnected by the bottom panel 129.

The absorbent filling-up part 124 is formed by the partition panel 122, one pair of side panels 127a and 127b, and the side panel 126b. The support part 12a is disposed below the partition panel 122 and on predetermined positions of the side panels 126b, 127a and 127b, and the porous panel (not shown) is mounted on the support part 124a. The porous panel is provided with many holes through which the absorbents cannot pass. In addition, the absorption unit 130 has the same structure as that of the absorption unit 120.

In the piled-up absorption units 120 and 120, gas is supplied into the lower absorption unit 130 from one opening via a space formed by one inclined panel 128a of the upper absorption unit and the pair of side panels 127a and 127b. Next, the gas is sent to a gas flowing-in part formed by the side panel 132a of the lower absorption unit 130 corresponding to the side panel 126a of the upper absorption unit 120 and the pair of side panels 133a and 133b of the lower absorption unit corresponding to the other pair of side panels 127a and 127b of the upper absorption unit, and the partition panel of the lower absorption unit 130 corresponding to the partition panel 123 of the upper absorption unit. Next, the gas is further sent to a gas flowing path part formed by the pair of side panels 133a and 133b and the bottom panel of the lower absorption unit corresponding to the bottom panel 129 of the upper absorption unit 120. Next, the gas passes through the porous panel of the lower absorption unit 130, between absorbents, and through a space formed by the pair of side panels 127a and 127b of the upper absorption unit and the inclined panel 128b, and then exhausted from the other opening 131.

The absorption units 120 and 130 shown in FIG. 12 are filled with the absorbents. When the absorption units 120 and 130 are used for, for example, to absorb and remove nitrogen oxide, the absorption units 120 and 130 can be filled with absorbents having a predetermined particle diameter made of coconut husk active charcoal, active charcoal made of pitch, active charcoal made of PAN, carbon fibers, carbon nanotubes, active white clay, alumina, zeolite, silica, magnesia, titania and the like. The aforementioned ceramic balls can be filled as fillers. Further, the tilt angle against the horizontal direction of one inclined panel 128a adjacent to the gas flowing-in part can be 40 to 60 degrees, preferably 45 degrees. As for the tilt angle of the other inclined panel 128b, the ratio of a range between the partition panel 122 and the bottom panel 129 in the vertical direction to a range between the partition panel 122 and the side panel 126b constituting the absorbent filling-up part 124 in the horizontal direction can be in the range of 1:1 to 1:10, preferably in the range of 1:2 to 1:5. In order to reduce a loss of a pressure required to flow a gas and make the gas pass through the absorbent layers evenly, the bottom of the absorption unit preferably has a shape of a smooth curve instead of being constructed by the two inclined panels 128a and 128b. However, when the bottom has a curved surface, the areas of the flow paths for gas flowing into and exhaust from the lower absorption unit 130 become small. Therefore, the above-described two inclined panels 126a and 128b preferably have the above-described tilt angle. In addition, in the gas flowing path part, the formation in the above-described range makes it possible of attaining a sufficient rectification effect of gas passing therethrough.

FIELD OF THE INVENTION

The present invention relates to a method and an equipment for removing nitrogen oxide contained in gas, and particularly to a method capable of effectively removing nitrogen oxide contained in air and a nitrogen oxide removal equipment capable of being used suitably in the execution of the above removal method.

The invention claimed is:

1. A nitrogen oxide removal equipment for removing nitrogen oxide contained in gas, comprising:
   a nitrogen oxide absorption means provided with an absorption unit for removing nitrogen oxide contained in said gas by passing said gas through a solid absorbent layers,
   said absorption unit comprising:
      an absorbent storage part surrounded by a boundary wall of a storage part, a bottom panel of a storage part, and an upper portion of an outlet side, and provided with said solid absorbent layers therein; and
      a plurality of low-profile unit bodies being placed vertically and adjacently and being provided with a gas rectification part in which gas is caused to pass through said solid absorbent layers, and
   said unit body comprising:
      an intake side surface;
      an outlet side surface disposed opposite to said intake side surface and provided with said upper portion of said outlet side and a lower portion of an outlet side;
      said storage part boundary wall disposed between said intake side surface and said outlet side surface;
      said bottom panel of said storage part disposed horizontally from a lower end of said boundary wall of said storage part to said upper portion of said outlet side;
      a bottom of said rectification part disposed below a boundary of an outlet side, said boundary including a boundary between said upper portion of said outlet side and said lower portion of said outlet side;
      a bottom panel of said intake side extending from said intake side surface to said bottom of said rectification part; and
      a bottom panel of said outlet side extending from said boundary of said outlet side to said bottom of said rectification part,
      wherein a ratio of A:B is in a range of 1:1 to 1:10, where A represents a distance from a boundary defined by said bottom of said rectification part and said bottom panel extending to said outlet side to said bottom panel of said storage part while B represents a distance from said boundary to said outlet side surface, said boundary being placed near to said intake side surface while said bottom of said rectification part extending so as to be aligned to said boundary wall of said storage part of another unit body at said intake side.

2. The nitrogen oxide removal equipment according to claim 1, wherein said intake side surface is provided with an upper portion of an input side and a lower portion of an input side;
   said bottom of said rectification part is disposed below a boundary of an intake side, said boundary containing a boundary between said upper portion of said intake side and said lower portion of said intake side; and
   said bottom panel of said intake side extends from said boundary of said intake side to said bottom of said rectification part.

3. The nitrogen oxide removal equipment according to claim 2, wherein said nitrogen oxide absorption unit is formed by integrally laminating a plurality of absorption units in a vertical direction;
   said unit body is separated from said rectification part by said bottom of said rectification part, said bottom panel of said intake side and said bottom panel of said outlet side, and provided with a rectification part for a lower-stage unit to be said gas rectification part of another absorption unit disposed below when said absorption units are laminated;
   a gas intake to said rectification part for a lower-stage unit is provided on said lower portion of said intake side; and
   a gas outlet from said rectification part for a lower-stage unit is provided on said lower portion of said outlet side.

4. The nitrogen oxide removal equipment according to claim 1, wherein an angle θ between said bottom panel of said intake side and said upper portion of said intake side is in a range of 90 to 180 degrees.

5. The nitrogen oxide removal equipment according to claim 1, wherein said bottom of said rectification part is adjacent to said boundary wall of said storage part in a plane.

6. The nitrogen oxide removal equipment according to claim 1, wherein when said absorption units are laminated, said bottom of said rectification part disposed above is overlapped with an upper end of said boundary wall of said storage part of said absorption unit disposed below.

7. The nitrogen oxide removal equipment according to claim 1, wherein in case that a removal function of said solid absorbent layer is deteriorated, a regenerant supply means is provided to supply a regenerant to said nitrogen oxide absorption means so that nitrogen oxide absorbed in said solid absorbent layer is removed by said regenerant, thereby regenerating said deteriorated removal function.

8. The nitrogen oxide removal equipment according to claim 1, wherein said absorbent storage part and said gas rectification part have water-tightness.

9. The nitrogen oxide removal equipment according to claim 7, wherein said regenerant supply means is capable of individually supplying said regenerant to each of said absorption units.

10. The nitrogen oxide removal equipment according to claim 7, wherein said regenerant contains a sulfur-containing compound selected from the group consisting of alkali metal hydroxide, alkali earth metal hydroxide, lithium sulfite, sodium sulfite, potassium sulfite, calcium sulfite, magnesium sulfite, iron sulfite, copper sulfite, lithium thiosulfate, sodium thiosulfate, potassium thiosulfate, calcium thiosulfate, magnesium thiosulfate, and a mixture thereof.

11. The nitrogen oxide removal equipment for removing nitrogen oxide contained in gas comprising:
   absorption units provided with said plurality of low-profile solid absorbent layers constituting a nitrogen oxide absorption means; and
   a gas rectification means that supplies said gas to a large-area side of said low-profile solid absorbent layers each provided with unit bodies in said absorption unit, said unit bodies being placed vertically and adjacently;
   wherein said unit body comprises:
   an intake side surface;
   an outlet side surface disposed opposite to said intake side surface and provided with an upper portion of said outlet side and a lower portion of an outlet side;

said storage part boundary wall disposed between said intake side surface and said outlet side surface;

said bottom panel of said storage part disposed horizontally from a lower end of said boundary wall of said storage part to said upper portion of said outlet side;

a bottom of said rectification part disposed below a boundary of an outlet side, said boundary containing a boundary between said upper portion of said outlet side and said lower portion of said outlet side;

a bottom panel of an intake side extending from said intake side surface to said bottom of said rectification part; and a bottom panel of said outlet side extending from said boundary of said outlet side to said bottom of said rectification part, wherein a ratio of A:B is in a range of 1:1 to 1:10, where A represents a distance from a boundary defined by said bottom of said rectification part and said bottom panel extending to said outlet side to said bottom panel of said storage part while B represents a distance from said boundary to said outlet side surface, said boundary being positioned near to said intake side surface while said bottom of said rectification part extending so as to be aligned to said boundary wall of said storage part of another unit body at said intake side.

12. The nitrogen oxide removal method for removing nitrogen oxide contained in gas, comprising:

a removal step of removing nitrogen oxide contained in said gas by supplying said gas to a nitrogen oxide absorption unit that contains a low-profile solid absorbents that absorbs and removes nitrogen oxide via a gas rectification means that selectively supplies said gas to a large-area side of said low-profile solid absorbents disposed in a unit body, said nitrogen oxide absorption unit comprises a plurality of said unit bodies, said unit bodies being placed vertically and adjacently; and a regeneration step of regenerating said nitrogen oxide removal function of said nitrogen oxide absorption unit, which is deteriorated in said removal step, by removing nitrogen oxide absorbed in said solid absorbents by a regenerant containing a basic or a reducing substance, wherein said unit body comprises:

an intake side surface;

an outlet side surface disposed opposite to said intake side surface and provided with an upper portion of said outlet side and a lower portion of an outlet side;

said storage part boundary wall disposed between said intake side surface and said outlet side surface;

said bottom panel of said storage part disposed horizontally from a lower end of said boundary wall of said storage part to said upper portion of said outlet side;

a bottom of said rectification part disposed below a boundary of an outlet side, said boundary containing a boundary between said upper portion of said outlet side and said lower portion of said outlet side;

a bottom panel of an intake side extending from said intake side surface to said bottom of said rectification part; and a bottom panel of said outlet side extending from said boundary of said outlet side to said bottom of said rectification part, wherein a ratio of A:B is in a range of 1:1 to 1:10, where A represents a distance from a boundary defined by said bottom of said rectification part and said bottom panel extending to said outlet side to said bottom panel of said storage part while B represents a distance from said boundary to said outlet side surface, said boundary being positioned near to said intake side surface while said bottom of said rectification part extending so as to be aligned to said boundary wall of said storage Part of another unit body at said intake side.

13. The nitrogen oxide removal method according to claim 12, comprising:

a detection step of detecting said removal function by a nitrogen oxide sensor, wherein when deterioration of said removal function is detected in said detection step, said regeneration step is executed.

14. The nitrogen oxide removal method according to claim 12, wherein said regenerant is circulated between said nitrogen oxide absorption equipment and a regenerant tank that stores said regenerant.

15. The nitrogen oxide removal method according to claim 12, comprising:

a preprocessing step for turning nitrogen oxide contained in said gas into nitrogen dioxide, dinitrogen trioxide, dinitrogen quadroxide or dinitrogen quintoxide.

16. The nitrogen oxide removal method according to claim 12, wherein said gas is air collected in a tunnel of a road, a canal/an underpath, a shelter of a road, a parking area, nearby a road, or at a bus stop.

17. The nitrogen oxide removal method according to claim 16, wherein said basic substance is alkali metal hydroxide or alkali earth metal hydroxide, and said reducing substance is a sulfur-containing compound selected from the group consisting of sodium sulfite, potassium sulfite, calcium sulfite, magnesium sulfite, iron sulfite, copper sulfite, lithium thiosulfate, sodium thiosulfate, potassium thiosulfate, calcium thiosulfate, magnesium thiosulfate, and a mixture thereof.

18. The nitrogen oxide removal method according to claim 17, wherein when said regenerant contains a reducing substance, said removal function is regenerated in a nitrogen atmosphere.

19. The nitrogen oxide removal equipment for removing nitrogen oxide contained in gas, comprising:

a nitrogen oxide absorption unit that absorbs nitrogen oxide containing low-profile solid absorbents that absorb and remove nitrogen oxide disposed in a unity body, said nitrogen oxide absorption unit comprises a plurality of unity bodies, said unity bodies being placed vertically and adjacently;

a gas rectification means in selective fluid communication with a large-area side of said low-profile solid absorbents;

a regenerant supply such that, when a nitrogen oxide removal function of said nitrogen oxide absorption unit is deteriorated, a regenerant containing a basic or reducing substance is supplied to said nitrogen oxide absorption unit, wherein said deteriorated removal function is regenerated by removing nitrogen oxide absorbed in said solid absorbents by said regenerant, and said unity body comprising:

an intake side surface;

an outlet side surface disposed opposite to said intake side surface and provided with an upper portion of said outlet side and a lower portion of an outlet side;

said storage part boundary wall disposed between said intake side surface and said outlet side surface;

said bottom panel of said storage part disposed horizontally from a lower end of said boundary wall of said storage part to said upper portion of said outlet side;

a bottom of said rectification part disposed below a boundary of an outlet side, said boundary containing, a boundary between said upper portion of said outlet side and said lower portion of said outlet side;

a bottom panel of said intake side extending from said intake side surface to said bottom of said rectification part; and a bottom panel of said outlet side extending from said boundary of said outlet side to said bottom of said rectification part, wherein a ratio of A:B is in a range of 1:1 to 1:10, where A represents a distance from a boundary defined by said bottom of said rectification part and said bottom panel extending to said outlet side to said bottom panel of said storage part while B represents a distance from said boundary to said outlet side surface, said boundary being positioned near to said intake side surface while said bottom of said rectification part extending so as to be aligned to said boundary wall of said storage part of another unit body at said intake side.

20. The nitrogen oxide removal equipment according to claim 19, comprising:
a nitrogen oxide sensor that detects said removal function, wherein when said nitrogen oxide sensor detects nitrogen oxide of a predetermined concentration or higher, said removal function is regenerated.

21. The nitrogen oxide removal equipment according to claim 19, comprising:
a regenerant tank that stores said regenerant, wherein said regenerant is capable of being circulated between said regenerant tank and said nitrogen oxide absorption equipment.

22. The nitrogen oxide removal equipment according to claim 19, comprising:
a preprocessing means in which nitrogen oxide contained in said gas is caused to turn into nitrogen dioxide, dinitrogen trioxide, dinitrogen quadroxide or dinitrogen quitoxide, wherein said gas after passing through said preprocessing means is supplied to said nitrogen oxide absorption equipment.

23. The nitrogen oxide removal equipment for removing nitrogen oxide contained in gas, comprising:
a plurality of absorption units that remove said nitrogen oxide contained in said gas by passing said gas through low-profile solid absorbent layers via a rectification means that introduces said gas into a large-area side of said low-profile solid absorbent layers, said absorption units are provided with a plurality of space-saving-type nitrogen oxide absorption means laminated and integrated in a direction intersecting an extension direction of said solid absorbent layers.

24. The nitrogen oxide removal equipment according to claim 23, wherein each of said absorption units is provided with a control means that controls a flowing rate of said gas passing through said solid absorbent layers.

25. The nitrogen oxide removal equipment according to claim 23, comprising:
a regenerant supply means that supplies regenerant to said nitrogen oxide absorption means when a removal function of said solid absorbent layer is deteriorated, wherein nitrogen oxide absorbed in said solid absorbent layer is removed by said regenerant, thereby regenerating said deteriorated removal function.

26. The nitrogen oxide removal equipment according to claim 25, wherein said regenerant supply means is capable of individually supplying said regenerant to each of said absorption units.

27. The nitrogen oxide removal equipment according to claim 23, comprising:
a preprocessing means in which nitrogen oxide contained in said gas is caused to turn into nitrogen dioxide, dinitrogen trioxide, dinitrogen quadroxide or dinitrogen quintoxide.

28. The nitrogen oxide removal equipment according to claim 25, wherein said regenerant is a sulfur-containing compound selected from the group consisting of alkali metal hydroxide, alkali earth metal hydroxide, lithium sulfite, sodium sulfite, potassium sulfite, calcium sulfite, magnesium sulfite, iron sulfite, copper sulfite, lithium thiosulfate, sodium thiosulfate, potassium thiosulfate, calcium thiosulfate, magnesium thiosulfate, and a mixture thereof.

29. The nitrogen oxide removal equipment for removing nitrogen oxide contained in gas, comprising:
a humidifier; and
a nitrogen oxide absorption means that removes said nitrogen oxide contained in said gas by passing said gas through low-profile solid absorbent layers via a rectification means that introduces said gas into a large-area side of said low-profile solid absorbent layers, disposed in a unit body, said nitrogen oxide absorption means comprising a plurality of said unit bodies, said unit bodies being placed vertically and adjacently, and said unit body comprising:
an intake side surface;
an outlet side surface disposed opposite to said intake side surface and provided with an upper portion of said outlet side and a lower portion of an outlet side;
said storage part boundary wall disposed between said intake side surface and said outlet side surface;
said bottom panel of said storage part disposed horizontally from a lower end of said boundary wall of said storage part to said upper portion of said outlet side;
a bottom of said rectification part disposed below a boundary of an outlet side, said boundary including, a boundary between said upper portion of said outlet side and said lower portion of said outlet side;
a bottom panel of intake side extending from said intake side surface to said bottom of said rectification part; and
a bottom panel of said outlet side extending from said boundary of said outlet side to said bottom of said rectification part, wherein a ratio of A:B is in a range of 1:1 to 1:10, where A represents a distance from a boundary defined by said bottom of said rectification part and said bottom panel extending to said outlet side to said bottom panel of said storage part while B represents a distance from said boundary to said outlet side surface, said boundary being positioned near to said intake side surface while said bottom of said rectification part extending so as to be aligned to said boundary wall of said storage part of another unit body at said intake side; and
wherein said humidifier is integrated with said nitrogen oxide absorption means so as to overlap with said solid absorbent layers in a plane, and said gas after passing through said humidifier is supplied to said nitrogen oxide absorption equipment.

30. A nitrogen oxide removal equipment according to claim 29, comprising:
a water tank that stores humidifying water used by said humidifier, wherein
when a regenerant is supplied onto said solid absorbent layers, said regenerant after passing though said solid absorbent layers is supplied to said water tank, said solid absorbent layer is formed by solid absorbents containing a carbon material; and said regenerant is a sulfur-containing compound selected from the group consisting of alkali metal hydroxide, alkali earth metal hydroxide, lithium sulfite, sodium sulfite, potassium sulfite, calcium sulfite, magnesium sulfite, iron sulfite, copper sulfite, lithium thiosulfate, sodium thiosulfate, potassium thiosulfate, calcium thiosulfate, magnesium thiosulfate, and a mixture thereof.

* * * * *